(12) United States Patent
Balu

(10) Patent No.: US 11,562,168 B2
(45) Date of Patent: Jan. 24, 2023

(54) CLUSTERING FOR K-ANONYMITY IN LOCATION TRAJECTORY DATA

(71) Applicant: HERE Global B.V., Eindhoven (NL)

(72) Inventor: Raghavendran Balu, Eindhoven (NL)

(73) Assignee: HERE Global B.V., Eindhoven (NL)

(*) Notice: Subject to any disclaimer, the term of this patent is extended or adjusted under 35 U.S.C. 154(b) by 1227 days.

(21) Appl. No.: 16/036,109

(22) Filed: Jul. 16, 2018

(65) Prior Publication Data

US 2020/0019815 A1   Jan. 16, 2020

(51) Int. Cl.
*G06F 3/00* (2006.01)
*G06K 9/62* (2022.01)
*H04W 4/38* (2018.01)
*G06F 21/62* (2013.01)
*H04W 4/02* (2018.01)
*G06F 16/29* (2019.01)

(52) U.S. Cl.
CPC .......... *G06K 9/6223* (2013.01); *G06F 16/29* (2019.01); *G06F 21/6218* (2013.01); *G06K 9/6272* (2013.01); *H04W 4/025* (2013.01); *H04W 4/38* (2018.02)

(58) Field of Classification Search
CPC ................................. G06K 9/6272; G06F 9/54
See application file for complete search history.

(56) References Cited

U.S. PATENT DOCUMENTS

| | | | |
|---|---|---|---|
| 8,463,289 B2 | 6/2013 | Shklarski et al. | |
| 8,812,524 B2 | 8/2014 | Chen et al. | |
| 9,842,442 B2 | 12/2017 | Konicek | |
| 10,382,889 B1 | 8/2019 | Ajmeri | |
| 2012/0046860 A1* | 2/2012 | Curtis | H04W 4/02 701/418 |
| 2013/0142183 A1* | 6/2013 | Lee | H04W 72/08 455/517 |

(Continued)

FOREIGN PATENT DOCUMENTS

CN    105247894 A  *  1/2016  .......... G10L 19/008

OTHER PUBLICATIONS

Karen L. Olson, Privacy Protection Versus Cluster Detection in Spatial Epidemiology. (Year: 2002).*

(Continued)

*Primary Examiner* — Lechi Truong
(74) *Attorney, Agent, or Firm* — Lempia Summerfield Katz LLC

(57) ABSTRACT

An apparatus for providing anonymity in geographic data for probe devices in a geographic region for a location-based service includes at least a database, a clustering calculator and an anonymity controller. The database stores trajectory data based on sequences of sensor measurements of the probe devices. The clustering calculator clusters the trajectory data, according to a first iteration threshold, into clusters each defined by a cluster point and compares distance for a first cluster from the clusters to cluster points of other clusters of the clusters. The clustering calculator selects a second cluster from the clusters based on the comparison of distances and merges the first cluster and the second cluster into a merged cluster. The anonymity controller modifies the trajectory data to provide a predetermined level of anonymity to locations from the trajectory data in response to the merged cluster.

17 Claims, 26 Drawing Sheets

(56) References Cited

U.S. PATENT DOCUMENTS

| | | |
|---|---|---|
| 2014/0108361 A1 | 4/2014 | Biswas et al. |
| 2014/0266698 A1* | 9/2014 | Hall ...................... H04W 4/021 340/539.13 |
| 2017/0169252 A1 | 6/2017 | Ukena-Bonfig et al. |
| 2018/0014161 A1 | 1/2018 | Warren |
| 2019/0209022 A1* | 7/2019 | Sobol .................. A61B 5/7267 |

OTHER PUBLICATIONS

Jiemin Zeng, Mobile r-gather: Distributed and Geographic Clustering for Location Anonymity. (Year: 2017).*

Abul, Osman, Francesco Bonchi, and Mirco Nanni. "Never walk alone: Uncertainty for anonymity in moving objects databases." Data Engineering, 2008. ICDE 2008. IEEE 24th International Conference on. Ieee, 2008.

Andreas Fabri. 2D Polyline Simplification. In CGAL Userand Reference Manual. CGAL Editorial Board, 4.12 edition, 2018.

Andrienko, Natalia V., and Gennady L. Andrienko. "Spatial generalization and aggregation of massive movement data." IEEE Trans. Vis. Comput. Graph. 17.2 (2011): 205-219.

Bonchi, Francesco, Laks VS Lakshmanan, and Hui Wendy Wang. "Trajectory anonymity in publishing personal mobility data." ACM Sigkdd Explorations Newsletter 13.1 (2011): 30-42.

Byun, Ji-Won, et al. "Efficient k-anonymization using clustering techniques." International Conference on Database Systems for Advanced Applications. Springer, Berlin, Heidelberg, 2007.

Chen, Rui, et al. "Privacy-preserving trajectory data publishing by local suppression." Information Sciences 231 (2013): 83-97.

Chow, Chi-Yin, and Mohamed F. Mokbel. "Trajectory privacy in location-based services and data publication." ACM Sigkdd Explorations Newsletter 13.1 (2011): 19-29.

Dempster, Arthur P., Nan M. Laird, and Donald B. Rubin. "Maximum likelihood from incomplete data via the EM algorithm." Journal of the royal statistical society. Series B (methodological) (1977): 1-38.

El-Rashidy, M., et al. "An Effective K-Anonymity Clustering Method for Less Effectiveness on Accuracy of Data Mining Results." International Journal of Advanced Research in Computer Science 2.5 (2011).

Fengyun, Li, et al. "Segment Clustering Based Privacy Preserving Algorithm for Trajectory Data Publishing." China Conference on Wireless Sensor Networks. Springer, Singapore, 2017.

Galler, Bernard A., and Michael J. Fisher. "An improved equivalence algorithm." Communications of the ACM 7.5 (1964): 301-303.

Hunter, Timothy, Pieter Abbeel, and Alexandre Bayen. "The path inference filter: model-based low-latency map matching of probe vehicle data." IEEE Transactions on Intelligent Transportation Systems 15.2 (2014): 507-529.

Kohonen, T. "Exploration of very large databases by self-organizing maps." vol. I, pp. PL1-PL6, Proceedings of ICNN 1997.

Lafferty, John, Andrew McCallum, and Fernando CN Pereira. "Conditional random fields: Probabilistic models for segmenting and labeling sequence data." (2001).

Lin, Dan, et al. "Privacy-preserving location publishing under road-network constraints." International Conference on Database Systems for Advanced Applications Springer, Berlin, Heidelberg, 2010.

Liu, Jie, et al. "A Density-based Clustering Method for K-anonymity Privacy Protection." Journal of Information Hiding and Multimedia Signal Processing 8.1 (2017): 12-18.

Monreale, Anna, et al. "Movement data anonymity through generalization." Trans. Data Privacy 3.2 (2010): 91-121.

Nergiz, Mehmet Ercan, Maurizio Atzori, and Yucel Saygin. "Towards trajectory anonymization: a generalization-based approach." Proceedings of the SIGSPATIAL ACM GIS 2008 International Workshop on Security and Privacy in GIS and LBS. ACM, 2008.

Nergiz, Mehmet Ercan, Maurizio Atzori, and Yucel Saygin. Perturbation-driven anonymization of trajectories. Technical Report 2007-TR-017, ISTI-CNR, Pisa, 2007.

Poulis, Giorgos, et al. "Select-organize-anonymize: A framework for trajectory data anonymization." Data Mining Workshops (ICDMW), 2013 IEEE 13th International Conference on. IEEE, 2013.

Sui, Peipei, and Xianxian Li. "ROAT: Road-Network-Based Anonymization of Trajectories." Ubiquitous Intelligence & Computing, Advanced and Trusted Computing, Scalable Computing and Communications, Cloud and Big Data Computing, Internet of People, and Smart World Congress (UIC/ATC/ScalCom/CBDCom/IoP/SmartWorld), 2016 Intl IEEE Conferences. IEEE, 2016.

Wernke, Marius, et al. "A classification of location privacy attacks and approaches." Personal and ubiquitous computing 18.1 (2014): 163-175.

Kohonen, Teuvo. "The self-organizing map." Neurocomputing 21.1-3 (1998): 1-6.

* cited by examiner

CLUSTERING FOR K-ANONYMITY IN LOCATION TRAJECTORY DATA

FIELD

The following disclosure relates to anonymity for probe data for location-based services.

BACKGROUND

The Global Positioning System (GPS) or another global navigation satellite system (GNSS) provides location information to a receiving device anywhere on Earth as long as the device has a substantial line of sight without significant obstruction to three or four satellites of the system. Location-based services control features of an application based on location information from a GNSS or another source.

The increasing trend of smart phones and wide spread integration of GPS devices in vehicles lead to availability of large pool of user location data including stay-points, check-ins and mobility traces. When such mobility data is aggregated in a centralized manner, it makes new applications such as traffic analysis and prediction possible. The aggregated and sharing of mobility traces data is called trajectory data publishing.

Trajectory data publishing is central to location data analysis and has wide applications including urban planning, location-based services, intelligent vehicles, logistics, and others. Though the usefulness of such publishing is unquestionable, the trade-off being made is privacy of contributing users and control over data.

The privacy factor is equally important, considering that user location data is personal and sensitive. When it is possible to trace back the contributing user it might lead to unintended consequences that harms the safety and security of contributors. Equally important is the role of regulation and compliance becomes crucial. Hence data publishing should not violate user rights and preserve their privacy. In practice the aggregation is oblivious to the contributing user and hence the responsibility or preserving user privacy is pushed to the service provider or aggregator.

SUMMARY

In one embodiment, a method for providing anonymity in geographic data for probe devices in a geographic region for a location-based service includes receiving trajectory data based on sequences of sensor measurements of the probe devices, clustering, by a processor, the trajectory data, according to a first iteration threshold, into a plurality of clusters each defined by a cluster point, selecting a first cluster from the plurality of clusters, performing, by the processor, a comparison of distances from the cluster point of the first cluster to cluster points of other clusters of the plurality of clusters, selecting a second cluster from the plurality of clusters based on the comparison of distances, merging the first cluster and the second cluster into a merged cluster, calculating, by the processor, a merged cluster point for the merged cluster, modifying the trajectory data in the merged cluster to a modified location based on the merged cluster point, and providing anonymized locations including the modified location to the location-based service.

In one embodiment, an apparatus for providing anonymity in geographic data for probe devices in a geographic region for a location-based service includes at least a database, a clustering calculator and an anonymity controller. The database stores trajectory data based on sequences of sensor measurements of the probe devices. The clustering calculator clusters the trajectory data, according to a first iteration threshold, into clusters each defined by a cluster point and compares distance for a first cluster from the clusters to cluster points of other clusters of the clusters. The clustering calculator selects a second cluster from the clusters based on the comparison of distances and merges the first cluster and the second cluster into a merged cluster. The anonymity controller modifies the trajectory data to provide a predetermined level of anonymity to locations from the trajectory data in response to the merged cluster.

In one embodiment, a non-transitory computer readable medium including instructions that when executed by a process are configured to perform clustering trajectory data into a plurality of clusters each defined by a centroid, performing a comparison of distances from the centroid of a first cluster to centroids of other clusters of the plurality of clusters, merging the first cluster and a second cluster into a merged cluster; and modifying the trajectory data in the merged cluster to a modified location.

BRIEF DESCRIPTION OF THE DRAWINGS

Exemplary embodiments of the present invention are described herein with reference to the following drawings.

DETAILED DESCRIPTION

Figure 1:
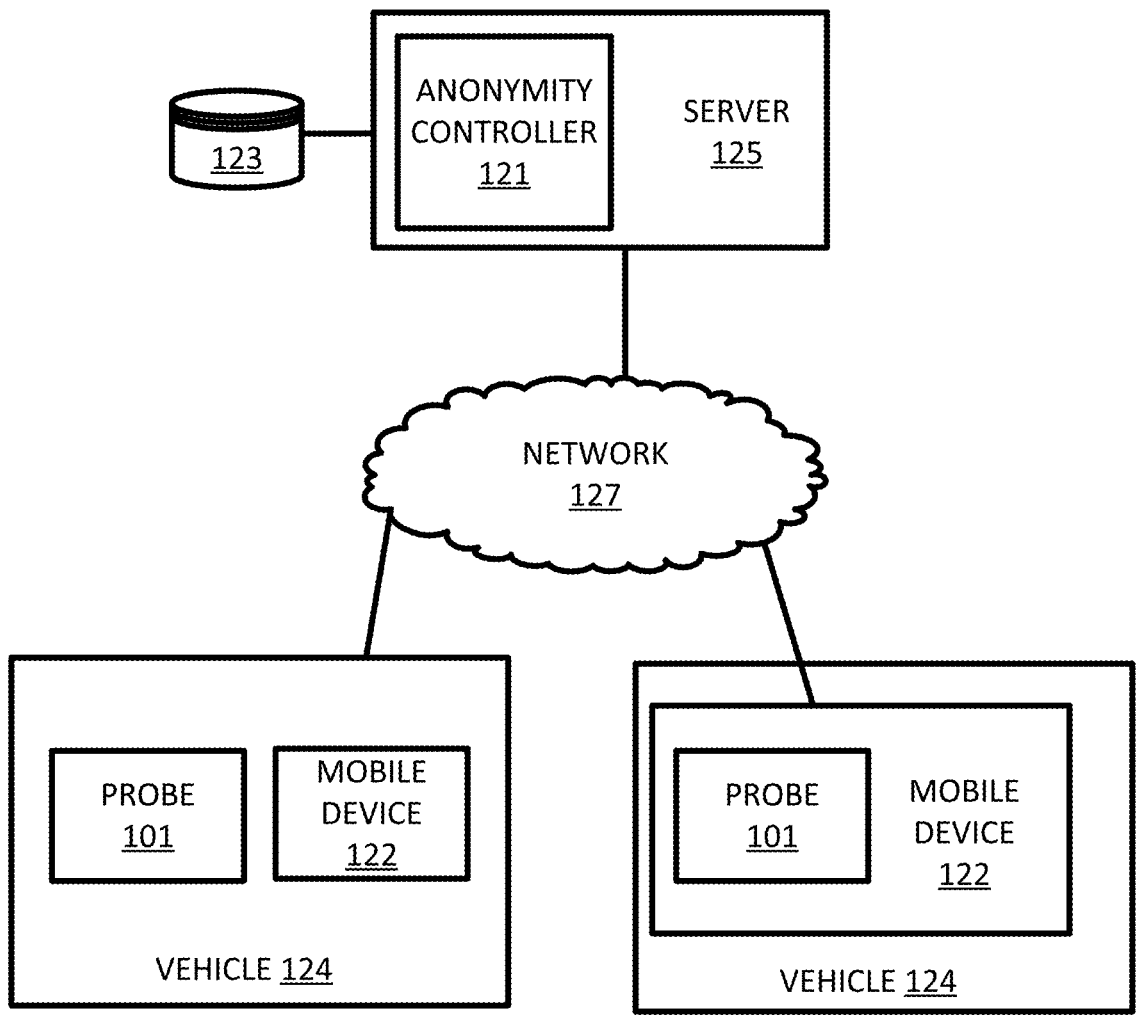
FIG. 1 illustrates an example system for anonymity in location trajectory data.

Location information is detected and stored by a variety of devices. Primarily, mobile devices such as vehicles, mobile phones or smart phones are continuously (or at frequent intervals) determining their current positions and reporting the location information. The location information may be logged by many different entities. Social media applications may track users for the purpose of identifying contacts or places to visit and may provide content in response to location. Mapping and navigation application provide turn-by-turn directions or maps based on the location information. Crowd sourcing applications provide reviews on products or points of interest (POIs) according to location information.

In some examples, an intermediary such as a map developer maintains the database of location information. The map developer may provide an open location platform that the other application may access to obtain location information. The security or privacy of the location information depends on the security policies of each of the applications. A data breach by any of these applications may result in the identity and habits of the users being compromised.

To protect privacy the location information may be stored anonymously using anonymous probe identities. That is, the identity of the user may be anonymous with respect to the log of location information. Providing anonymous data to location-based services and data publishing protects the identity of the users. The term anonymization means that users access location based-services provided by centralized services without revealing their location trajectory to these providers. The anonymization component acts a proxy for such users and acts on their behalf during service access to make sure that the providers cannot construct trajectories out of the access logs. Another prominent use-case is a trusted third party which is in possession of trajectory data aggregated from a huge collection of users, trying to publish on their behalf, without revealing their identities.

An example naive approach is to remove identifying qualifiers and release the data, which is also called as pseudonymization. In practice, this does little to mitigate the risks because an adversary may break the protection and identify the user with external information. A repeatedly observed trip from a residential place to a business place may suggest the home location and office location; frequent visits to a hospital may suggest health issues. The following embodiments provide improved anonymization of pseudonymization.

In another aspect, strong privacy preserving techniques involving data perturbation, lead to noise data that is published impacting the utility of shared data. This requires use of more sophisticated privacy preserving techniques that can guarantee best utility-privacy trade-off.

K-anonymity is a property of a set of data such that the data for one person or entity cannot be distinguished from at least k–1 people or entities in the release. In some embodiments herein, K-anonymization is used to provide anonymity in trajectory data.

K-anonymization and clustering methods have a strong connection, as the underlying problem is determining an optimal grouping that best represents the structure of the data. Clustering is a technique that operates under the context of K-anonymity. Clustering the data that improves the grouping in an iterative fashion. The following embodiments include iterative clustering with three steps at each iteration: assign, maximize and constrain. The approach is an extension to iterative methods: assign-maximize with added constrain step that enforces K-anonymity at every clustering iteration. The constrained interleaved clustering progressively improves clustering quality by minimizing the distortion with anonymity constraints in place. Two clustering algorithms, partition based and neighborhood based, within this framework are applied individually or in combination to achieve K-anonymity. In some embodiments, privacy is improved during the detection, storage, and servicing of probe data through the use of K-anonymity.

The following embodiments relate to several technological fields including but not limited to navigation, autonomous driving, assisted driving, traffic applications, and other location-based systems. The following embodiments achieve advantages in each of these technologies because the extent of the geographic area that accurate data can be provided to applications or third parties while maintaining the requisite security and private is improved. In each of the technologies of navigation, autonomous driving, assisted driving, traffic applications, and other location-based systems, the number of users that can be adequately served is increased. In addition, users of navigation, autonomous driving, assisted driving, traffic applications, and other location-based systems are more willing to adopt these systems given the technological advances in the data security.

FIG. 1 illustrates an example system for providing k-anonymity to trajectory data or probe data. The trajectory data may be a sequence of points collected by a probe or mobile device. Anonymity of the users means that the privacy is protected from unauthorized users revealing the identity and actions of the users and protected from analysis of user habits (e.g., frequently visited places) revealing the identity and actions of the users. The following embodiments prevent a tracking threat. An attacker that gains access to the data is prevented from determining identities from the data.

In FIG. 1, one or more vehicles 124 are connected to the server 125 though the network 127. The server 125 includes an anonymity controller 121 that modifies a set of trajectory data to provide anonymization. The vehicles 124 may be directly connected to the server 125 or through an associated mobile device 122. A map developer system, including the server 125 and a geographic database 123, exchanges (e.g., receives and sends) data from the vehicles 124. The mobile devices 122 may include local databases corresponding to a local map, which may be modified according to the server 125. The local map may include a subset of the geographic database 123 and are updated or changed as the vehicles 124 travel. The mobile devices 124 may be standalone devices such as smartphones or devices integrated with vehicles. Additional, different, or fewer components may be included.

Each vehicle 124 and/or mobile device 122 may include position circuitry such as one or more processors or circuits for generating probe data. The probe data may be generated by receiving GNSS signals and comparing the GNSS signals to a clock to determine the absolute or relative position of the vehicle 124 and/or mobile device 122. The probe data may be generated by receiving radio signals or wireless signals (e.g., cellular signals, the family of protocols known as WiFi or IEEE 802.11, the family of protocols known as Bluetooth, or another protocol) and comparing the signals to a pre-stored pattern of signals (e.g., radio map). The mobile device 122 may act as probe 101 for determining the position or the mobile device 122 and the probe 101 may be separate devices.

The probe data may include a geographic location such as a longitude value and a latitude value. In addition, the probe data may include a height or altitude. The probe data may be collected over time and include timestamps. In some examples, the probe data is collected at a predetermined time interval (e.g., every second, ever 100 milliseconds, or another interval). In some examples, the probe data is collected in response to movement by the probe 101 (i.e., the probe reports location information when the probe 101 moves a threshold distance). The predetermined time interval for generating the probe data may be specified by an application or by the user. The interval for providing the probe data from the mobile device 122 to the server 125 may be may the same or different than the interval for collecting the probe data. The interval may be specified by an application or by the user.

Communication between the vehicles 124 and/or between the mobile device 122 and the server 125 through the network 127 may use a variety of types of wireless networks. Example wireless networks include cellular networks, the family of protocols known as WiFi or IEEE 802.11, the family of protocols known as Bluetooth, or another protocol. The cellular technologies may be analog advanced mobile phone system (AMPS), the global system for mobile communication (GSM), third generation partnership project (3GPP), code division multiple access (CDMA), personal handy-phone system (PHS), and 4G or long term evolution (LTE) standards, 5G, DSRC (dedicated short range communication), or another protocol.

The anonymity controller 121 provides the anonymized data to the mobile device 122. The mobile device 122 may use the anonymized trajectory data for local applications. For example, a map application may provide previously traveled routes or visited POIs according to the anonymized trajectory data. A social media application may provide targeted content based on the anonymized trajectory data. A game application may provide a setting or objects within the game in response to the anonymized trajectory data.

Figure 2:
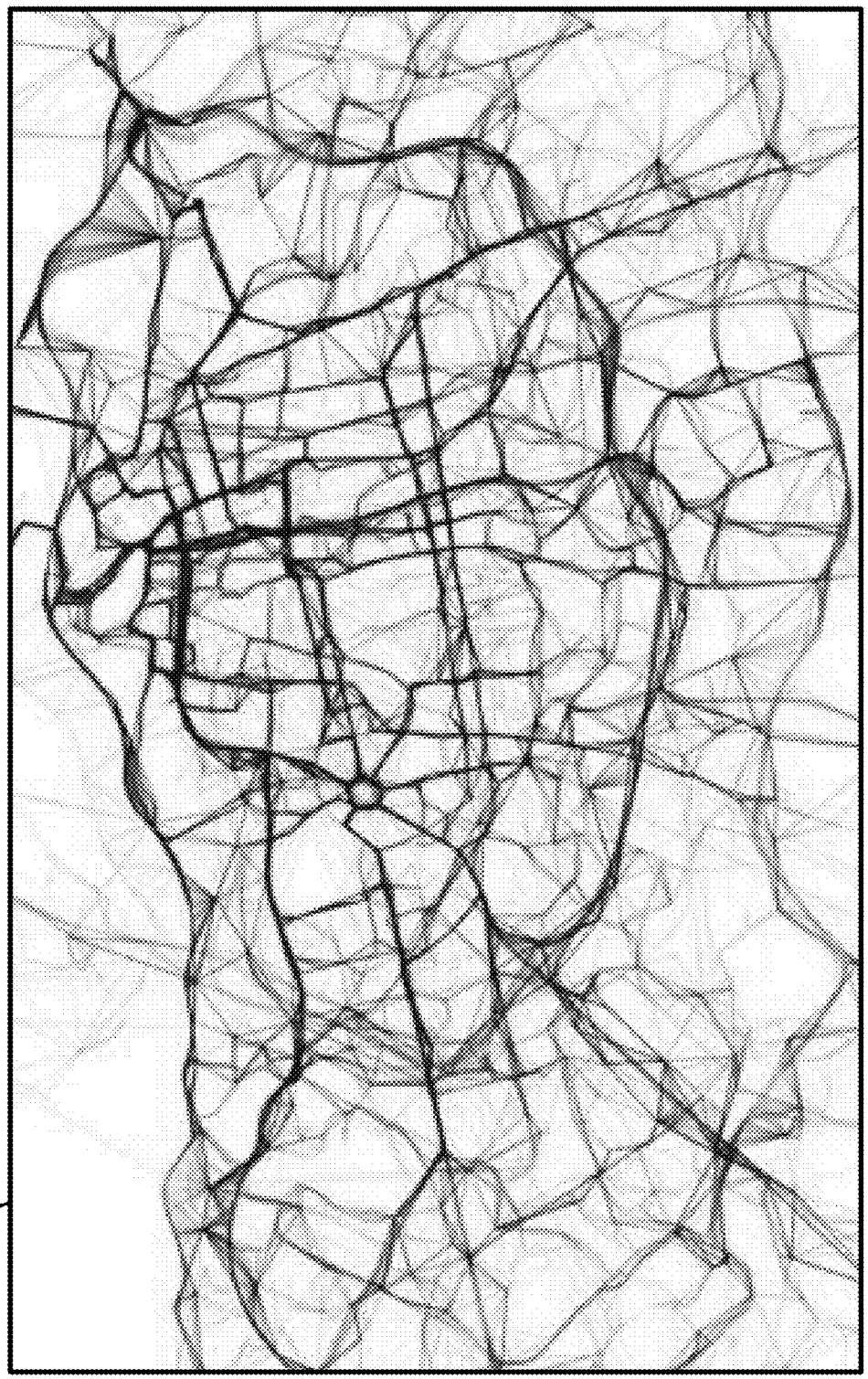
FIG. 2 illustrates an example map of trajectory data.

FIG. 2 illustrates a set of trajectory data 50 illustrated on a map. The set of trajectory data 50 was collected by a group of taxicabs in the city of Porto, Portugal. A trajectory is a sequence of the probe data. For example, a trajectory is a sequence of spatiotemporal coordinates $\mathcal{T} = \{t_u\}$, with $t_u = <(x_1, y_1, t_1) \ldots (x_n, y_n, t_n)>$, where $(x_i, y_i, t_i)$ is the $i^{th}$ sample instance of the trajectory with $(x_i, y_i)$ being the spatial information (longitude, latitude) and $t_i$ being the timestamp of the sample. A trajectory can also be decomposed into a sequence of segments $<(x_i, y_i, t_i), (x_{i+1}, y_{i+1}, t_{i+1})>$ formed by successive samples of the trajectory. This leads to the definition of sub-trajectory as a sub-sequence of the original trajectory $t_u[1:m] = <(x_1, y_1, t_1) \ldots (x_m, y_m, t_m)> \subset t_u | m \leq n$. The trajectory data may be stored in memory or database 123.

Releasing or publishing an unchanged version of the sequence of spatiotemporal coordinates $\mathcal{T}$ may violate usual privacy (e.g., reveal the identities of one or more persons, devices, or entities). Rather than release or publish the sequence of spatiotemporal coordinates $\mathcal{T}$, the following embodiments release or publish $\widetilde{\mathcal{T}}$ (anonymized trajectory data) such that $|\widetilde{\mathcal{T}} - \mathcal{T}| < B$, such that B signifies the maximal allowed distortion that is introduced by the privacy preserving mechanism. Different privacy metrics pose certain restrictions on $\widetilde{\mathcal{T}}$ to assure privacy.

K-anonymity is a privacy enforcing metric that assures privacy means of duplication and indistinguishability. A database or a set of data is said to be K-anonymous if for every instance in a database, there are K−1 similar (indistinguishable) instances in the database, that is, for every $|t_u \in \widetilde{\mathcal{T}}| \geq K$. The problem can be interpreted as binning trajectories in minimum k-sized bins such that distortion B is minimized.

Achieving such anonymity optimally is a challenging problem and is NP-hard (e.g., the time for solving the problem of anonymity is bounded by a polynomial expression in the size of the input and the solution is quickly solvable). The peculiarity of trajectory data when compared to regular relational database is that in case of relational data, there is a separation between quasi-identifier and sensitive attributes. In trajectory data the difference is blurry (i.e. sub-trajectory is a quasi-identifier by itself that can de-anonymize the rest of trajectory that is treated as sensitive attribute). Consider an adversary who has sub-trajectories in possession and uses it to identify the users for rest of the data. This property makes anonymizing mechanisms challenging for location data.

Techniques such as suppression, segmentation, generalization, clustering, and resampling that may be performed on the trajectory data. Suppression is simpler among these and achieves privacy by removing instances that violates k-anonymity which impacts utility. The removed instances may be one or more samples (e.g., a subset of) samples that form a trajectory. The removed instances may include one or more trajectories in the database altogether. Segmentation breaks long trajectories into smaller sub-trajectories such that the database constructed out of such sub-trajectories is k-anonymous. Generalization, on the other hand, achieves by generalizing the instances in such a way that instances are collapsed together to a coarser level. Spatial generalization involves abstracting individual instances to higher level spatial regions. Generalization may also be applied to the trajectory data in time to abstract individual instance to larger temporal groups. Clustering achieves indistinguishability by taking advantage of the underlying data distribution and grouping trajectory segments based on similarity among them. Resampling requires clustering to find equivalence classes out of trajectories and reconstructs original trajectory with samples found within the groups (e.g. representative points).

The following embodiments may include additional techniques for anonymizing the trajectory data. The anonymity controller 121 may be configured to perform iterative clustering techniques alternate between two or more steps, which in one example include the steps of optimal cluster assignments to each instance in the data among the possible clusters (assignment) and improving the cluster statistics based on the new assignments (maximization). The two steps may be repeated until the stopping criteria is met. The anonymity controller 121 may perform assignment and maximization, then check the stopping criteria, and the repeat the assignment and maximization if the stopping criteria are not met. The stopping criteria may be a single stopping criterion or multiple criteria. A technique that follows this iterative process may be referred to as expectation maximization (EM) or EM with a modification for soft assignments (assignments that are changed in time). Soft assignment means that the assignment is weighted or probabilistic where weights add up to a constant (1).

EM is a probabilistic technique to learn parameters with latent variables through maximum likelihood estimation or maximum a posteriori estimation. These techniques maximize the likelihoods by alternately estimating between assignments of the latent variables and the model parameters. The following embodiments utilize an EM technique with hard assignments. Hard assignment means that the assignment is not weighted or probabilistic, and a point is fully assigned to one class or cluster. That is, each point is assigned as a member to a single one of the K clusters.

The following embodiments include a constraint for k-anonymity. The anonymity controller 121 is configured to iteratively optimize k-anonymization through three successive steps (1) assign optimal cluster to each instance in the dataset, (2) maximize the likelihood of the cluster model parameters, and (3) apply privacy constraint.

The clustering model is parameterized with a set of representative elements from the dataset and cluster assignment is grouping the instances to the closest one among the representatives. The data is spatial data and hence, maximizing the likelihood means minimizing spatial distortion measured by means of distance between the instance and its representative. The closest assignment results in uneven attribution in terms of membership, so the number of representatives may be lower than K. Because these points may violate anonymity property, the representatives are removed so that the members that are assigned to them are reassigned to a better representative in the successive step, introducing distortion as a side effect. Repeating this iteratively reduces such distortion and hence anonymity constraint is enforced without too much distortion.

Figure 3:
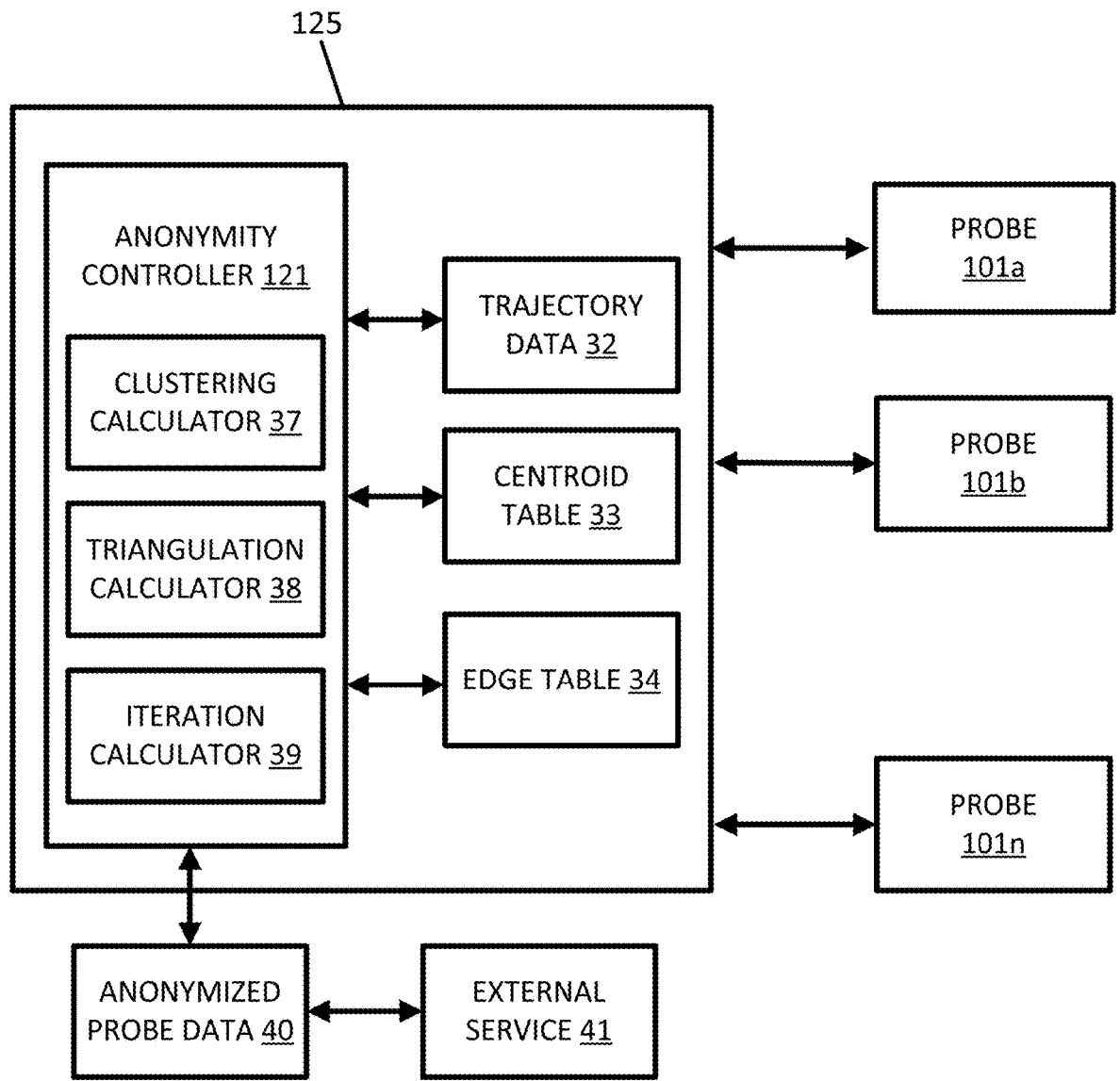
FIG. 3 illustrates an example central server for controlling anonymity in location trajectory data.

FIG. 3 illustrates an example central server 125 for modifying trajectory data for anonymization. The server 125 includes the anonymity controller 121 connected to multiple mobile devices 101a-101n. The anonymity controller 121 includes a clustering calculator 37, a triangulation calculator 38, and an iteration calculator 39. The anonymity controller 121 accesses data stored in memory or received from the mobile device 101. The data includes trajectory data 32, a centroid table 33, and an edges table 34. The anonymity controller 121 outputs the anonymized probe data 40, which may be provided to one or more external services 41. Addition, different, or fewer components may be included.

The following embodiments include new approaches that are highly suited to model trajectory data and maintain anonymity. A first embodiment includes adaptive quantization based clustering, and a second embodiment includes segment neighborhood based clustering. The adaptive quantization embodiment considers trajectories as sequence of points and creates partition of these points by quantizing with emphasis on variation in spatial densities across regions. The segment neighborhood clustering embodiment considers trajectory as a set of line segments and groups these segments based on the neighborhood statistics. Both of the embodiments follow the iterative three step approach. The two embodiments may be combined in part or in whole.

Either embodiment, or a combination thereof, may provide the anonymized probe data 40 to an external service 41. The anonymized data may be reported as a set of data describing locations and time for probes in a geographic area. The external service 41 may be a location based service, which may be executed on a mobile device 122 or vehicle 124. The external service 41 may perform an analysis on the anonymized data in order to identify traffic patterns in the geographic database. Traffic patterns may be reports to other mobile devices 122 or vehicles 124.

Adaptive Quantization for Spatial Data with Partition Based Clustering

Figure 4:
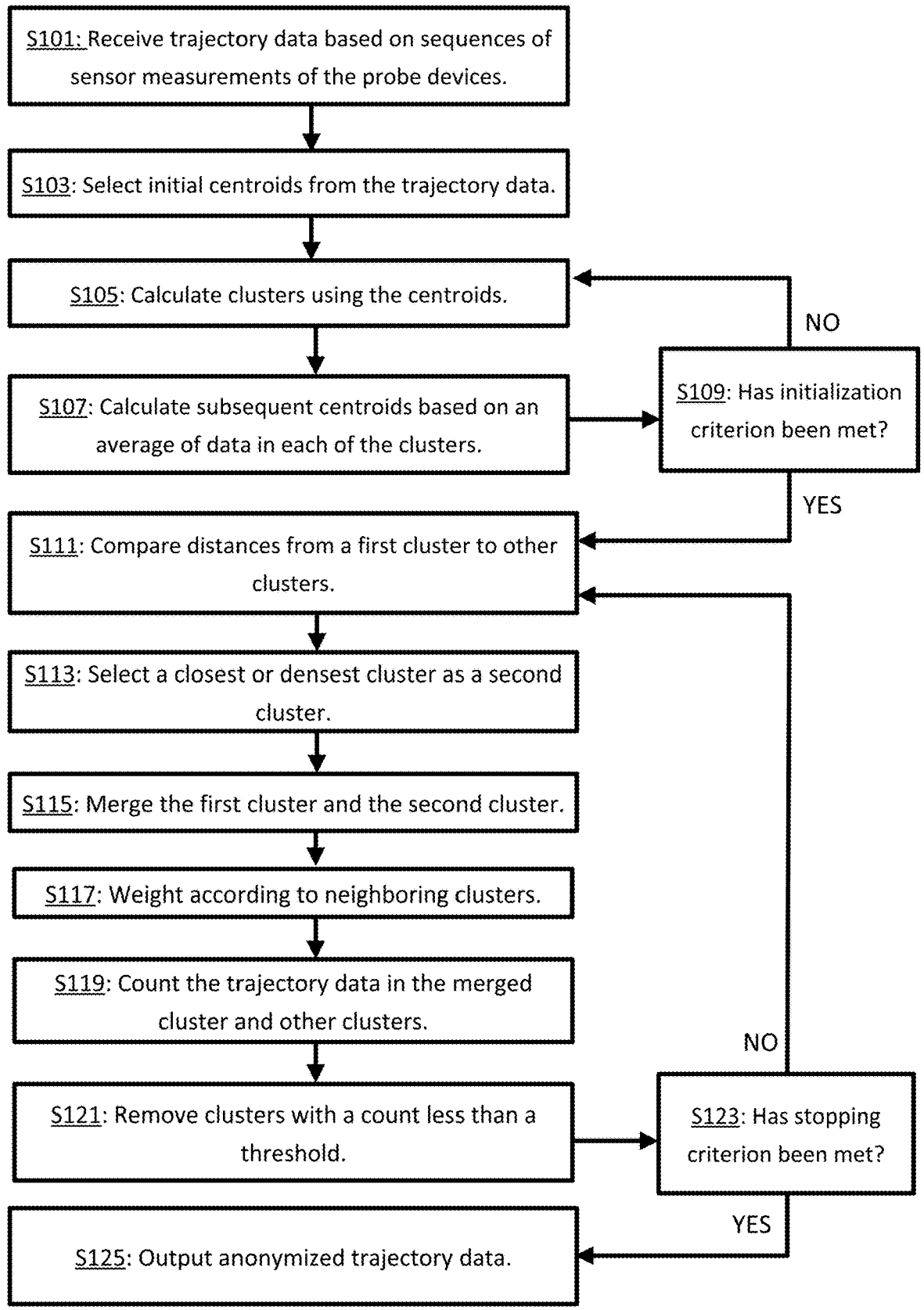
FIG. 4 illustrates a flow chart for a clustering technique for providing anonymity.

FIG. 4 illustrates a flow chart for providing anonymized trajectory data using the central server 125. The acts of FIG. 4 may be performed in the order presented or in another order. One or more of the acts of FIG. 4 may be repeated or omitted. Other acts may be included. The acts of FIG. 4 may be performed by the server 125 such as the anonymity controller 121 using the clustering calculator 37 and the iteration calculator 39. Alternatively, the acts of FIG. 4 may be performed by the mobile device 122 or a combination of the server 125 and the mobile device 122.

Figure 5:
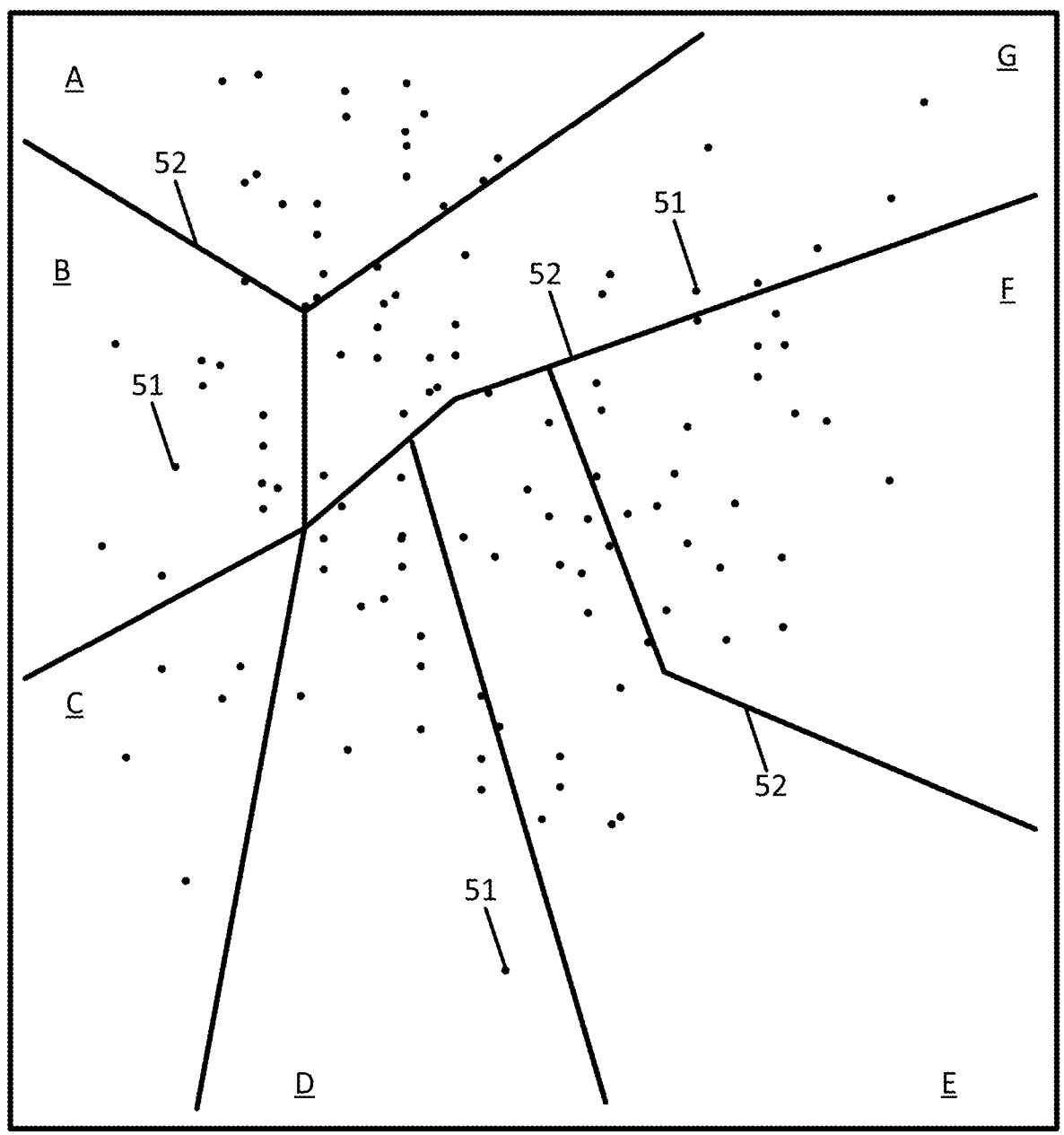
FIG. 5 illustrates an example trajectory data for a clustering technique.

FIG. 5 illustrates an example trajectory data for a partition-based clustering technique in order to find an optimal quantization of trajectory points to solve k-anonymization. In act S101, the anonymity controller 121 receives probe data from one or more probes 101a-n or the database 123. The probe data includes trajectories as sequences of measurements of the probes. The probe data, or sampled points 51, are illustrated in an arrangement that is geographically spaced. In other words, while it may be that no map is matched to the data, the representation in FIG. 5 illustrates the geographic spacing for the locations where the sampled points 51 were collected.

The sampled points 51 form trajectory data. A trajectory may be comprised of sampled points $51<(x_1, y_1, t_1) \ldots (x_n, y_n, t_n)>$, where $(x_i, y_i, t_i)$ is the $i^{th}$ sample instance of the trajectory with $(x_i, y_i)$ being the spatial information (longitude, latitude) and $t_i$ being the timestamp of the sample. Other coordinates may be used for the trajectories. The coordinates may be relative coordinates measured from a previously sampled point. The coordinates may be measured on a local grid for the geographic region. The coordinates may be spherical coordinates.

The anonymity controller 121 is configured to cluster the trajectory data. Throughout this discussion the manipulation of the trajectory data may be done on the point level (e.g., sampled points 51) or on the sequences of sampled points, which are referred to as trajectories. The anonymity controller 121 executes a clustering technique such as K-means clustering with the constraint that each cluster has at least K members. The clustering technique may also include modifications to suit the special requirements of spatial clustering. The modifications may be spatial properties, density variation, or other considerations. The characterization and clustering phase of the first embodiment is not tuned optimally to underlying data and is sensitive to user parameters. The density variation is minimized with minimal user input.

The K-means clustering, or another type of initial clustering, may include an initial clustering technique. The anonymity controller 121 is configured to cluster the trajectory data, according to a first iteration threshold and the initial clustering technique, into multiple clusters each defined by a cluster point. In acts S103, the anonymity controller 121 may assign an initial set of means or centroid points that define multiple clusters. Each cluster has a centroid, which may be referred to as a cluster point. The anonymity controller 121 may select centroid points from the trajectory data according to an initial centroid selection process and an initial number of clusters.

The initial number of clusters may be a predetermined number. The predetermined number may be determined by a user input. The predetermined number may be determined based on an analysis of the trajectory data. The predetermined number may be based on a quantity of the sampled points 51 or a density of the sampled points. The initial centroid selection process may be random (i.e., randomly select the predetermined number of points to serve as initial centroids for the initial clusters). The initial centroid selection process may be done through user input. The initial centroid selection process may be performed to select initial centroids that are distributed or geometrically spaced through the trajectory data, for example, to evenly divide the trajectory data, or according to another technique.

In act S105, regardless of how the initial centroids are determined, the clusters may be defined in response to the initial centroids. The clusters are defined such that all the points are assigned to the closest initial centroid. The closest initial centroid may be the one with least squared Euclidean distance. FIG. 5 illustrates boundaries 52 that divide the trajectory data into the initial clusters, labeled A-G.

Figure 6:
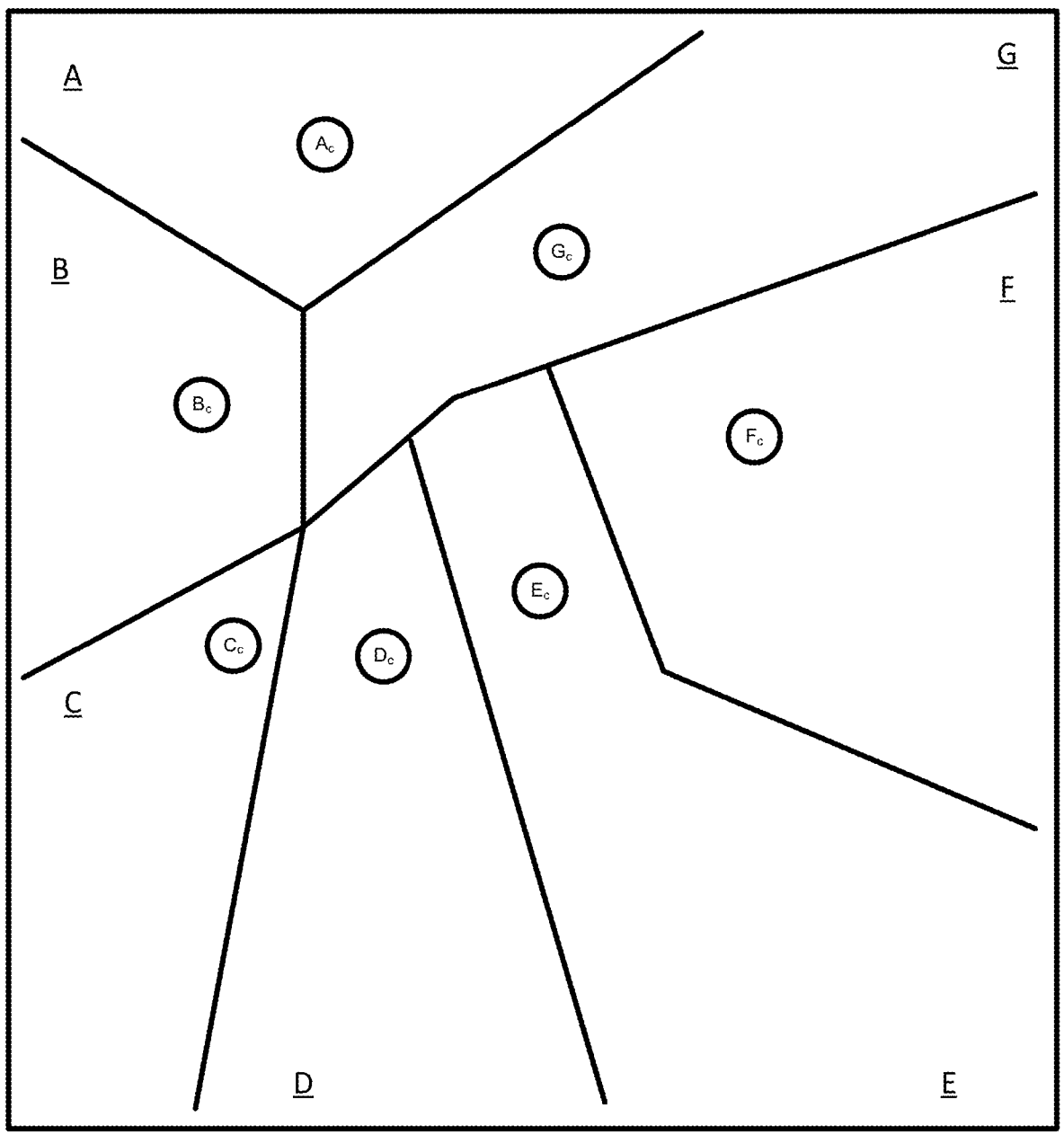
FIG. 6 illustrates an example initial state for the clustering technique.

After the initial clusters are assigned, the anonymity controller 121 re-assigns or modifies the clusters. In act S107, within each cluster, the trajectory data is averaged to determine a new mean or centroid for the cluster. FIG. 6 illustrates centroids $A_c$, $B_c$, $C_c$, $D_c$, $E_c$, $F_c$, and $G_c$, which may be the initial centroids or the subsequent centroids.

In act S109, the anonymity controller 121 determines whether an initialization criterion has been met. The initialization criterion, or for a first iteration threshold, may be based on a difference between a current centroid (e.g., from act S107) and the previous centroid (e.g., from act S103 or a previous iteration of act S107). The initialization criterion may be based on the differences between all of the current centroids and all of the previous centroids. When the difference is greater than a threshold, the initialization criterion is not met and the process proceeds to S105 to repeat S105 and S107. When the difference is less than the threshold, the initialization criterion is met and the process proceeds to S111.

Alternatively, initialization criterion may be based on the number of iterations determined by the iteration controller 39. The initialization criterion may be a number for a first iteration threshold. For example, the number of times to repeat the initial clustering technique. Examples for the number of times may be 3, 4, 5, 10, or 20. In act S109, the anonymity controller 121 through the iteration calculator 39 may increment an iteration count i (e.g., i=i+1). When the iteration count is less than the number of times to repeat the initial clustering technique, the initialization criterion is not met and the process proceeds to S105 to repeat S105 and S107. When the difference equals the number of times to repeat the initial clustering technique, the initialization criterion is met and the process proceeds to S111. The iteration criterion acts as a delay value (e.g., ¼ of total iterations) such that merging and splitting the clusters is delayed until the delay value is met and it can be assumed that the clusters reflect the underlying data distribution or data density of the underlying data. In other words.

The anonymity controller 121 through the clustering calculator 37 further simplifies the trajectories data using additional clustering. The K-means cluster points are further modified by following alternate steps of assignment and maximization to minimize quantization error, as shown by Equation 1 by substituting each point in the trajectory with its cluster centroid:

$$\Sigma_{(x_i, y_i) \in \mathcal{T}} \min_{c \in \mathcal{C}} \mathcal{D}((x_i, y_i), (x_c, y_c))^2 \quad \text{Eq. 1}$$

The assignment computes the closest centroid for each point among the clusters. Maximization is recomputing the centroid of each cluster $\mathcal{C}$ based on its corresponding members as shown by Equation 2.

$$(x_c, y_c) = \frac{1}{|\mathcal{C}|} \Sigma_{(x_i, y_i) \in \mathcal{C}} (x_i, y_i) \quad \text{Eq. 2}$$

These alternate steps are performed for multiple iterations until stopping criteria is met. Because all regions in spatial dataset are not uniformly represented as it is based on real data and to accommodate that we introduce additional criteria that splits and merges clusters at each iteration. The merge-split step follows maximization step.

In act S111, the anonymity controller 121 through the clustering calculator 37, for example, the clustering calculator 37, compares distances from a first cluster to other clusters. The distance may be Euclidean distances calculated from the square root of the squared sums of the differences in the coordinates of the centroid points. In one example, the anonymity controller 121 calculates the distances from each centroid to each of the other centroids. In another example, the anonymity controller 121 calculates the distances from a selected one of the centroids to the other centroids. In another example, as shown in FIG. 7, the anonymity controller 121 calculates the distance from each centroid to the next closest centroid.

Figure 7:
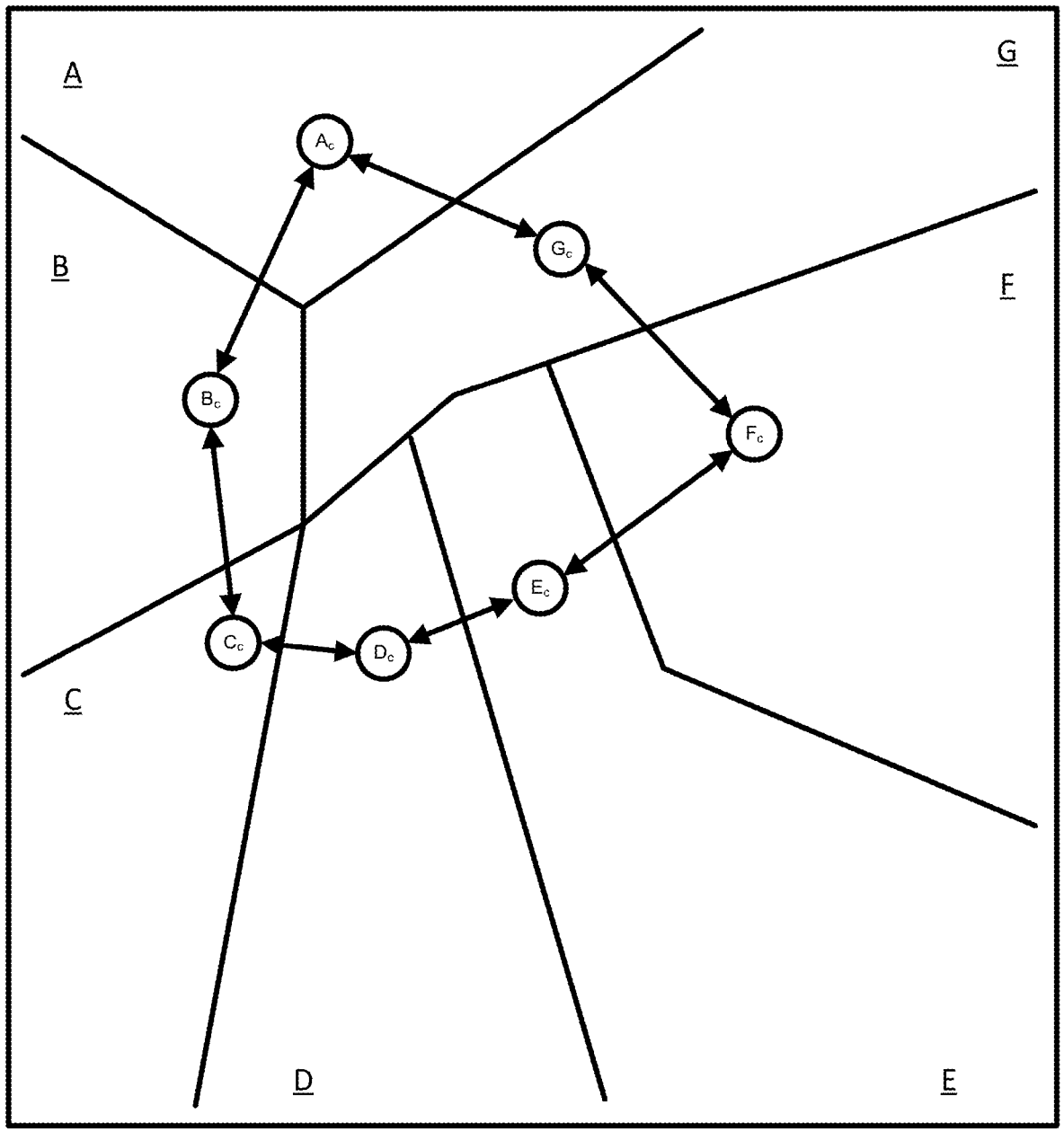
FIG. 7 illustrates an example centroid comparison for the clustering technique.

In act S113, the anonymity controller 121 selects the closest centroid or cluster, as shown by FIG. 7. The closest cluster may be the centroid that is closest to the selected centroid. When all of the centroids are analyzed, and every combination of centroids is considered, the closest centroid is included in the closest two centroids.

Alternatively, in act S113, the anonymity controller 121 selects the densest cluster. The densest cluster may be the cluster with the most trajectory data per unit area. In other examples, the densest clusters are automatically selected from selected the closest pair of centroids. Other techniques are possible to differentiate sparse regions from dense other than the closest inter-cluster distance.

The anonymity controller 121 through the clustering calculator 37 may be configured to generate the centroid table 33 based on the comparisons of the centroids of the clusters. The centroid table 33 may include all possible pairs of centroids. For example, using clusters A-G, the possible pairs include AB, AC, AD, AE, AF, AG, BC, BD, BE, BF, BG, CD, CE, CF, CG, DE, DF, DG, EF, EG, and FG. Any number of clusters may be included. When N clusters are included, N*(N+1) are stored in the centroid table 33. Alternatively, only unique pairs N/2*(N+1) are included in the centroid table 33. The centroid table 33 may store tens to hundreds or more of pairs of centroids. The anonymity controller 121 may sort the pairs in the centroid table 33 according to the distance between the centroids or the density or sparsity of the clusters.

Figure 8:
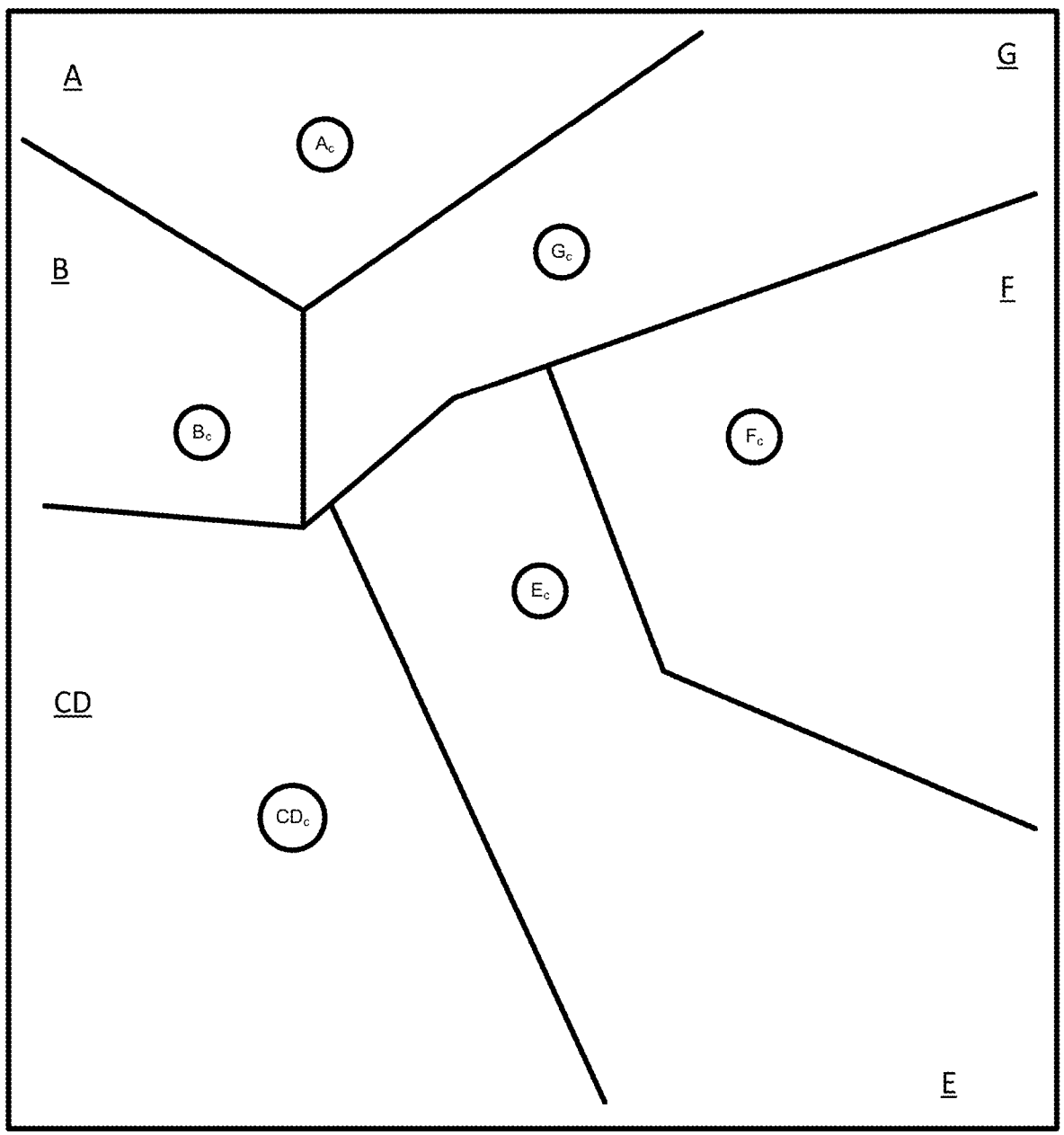
FIG. 8 illustrates an example merging of clusters.

In act S115, the anonymity controller 121 through the clustering calculator 37 merges the first cluster and the second cluster. In FIG. 7, the closest centroids are $C_c$ and $C_d$. Accordingly, in FIG. 8 clusters C and D are merged and a new centroid $CD_c$ is calculated by the anonymity controller 121. The new centroid $CD_c$ may be determined as the midpoint along a line connecting the old centroids are $C_c$ and $C_d$. To merge the first cluster and the second cluster, the anonymity controller 121 may recalculate boundaries. One or more boundaries are removed and one or more new boundaries are generated. The boundaries may be defined according to the trajectory data that is closest to the new centroid $CD_c$. It is possible that the new cluster includes data that was previously included in neighboring centroids B, E, and G or even more distance centroids A and F.

The anonymity controller 121 may access the centroid table 33 for merging of clusters. The anonymity controller 121 may merge clusters based on the sorted data for pairs of clusters in the centroid table 33. The anonymity controller 121 may select the top M percentile or quantile clusters, as ranked by density or distance to create a new cluster with a new centroid as the midpoint of the cluster-pair centroids. Examples for M include 2, 5, 10, 20 or another number. The anonymity controller 121 may select, for any particular cluster point, the cluster point for another cluster that is closest or has the shortest distance. The anonymity controller 121 may select the top closest pairs out of all of the cluster points. The top closest pairs of cluster points may also correspond to the densest clusters. Therefore, the anonymity controller 121 may merge a predetermined number or percentage of the closest center points or densest clusters into a single new cluster. Alternatively, the anonymity controller 121 may merge a predetermined number or percentage of subsets the closest center points or densest clusters into new clusters. The subsets may be made up of a pair of clusters or a greater number of clusters.

Figure 9:
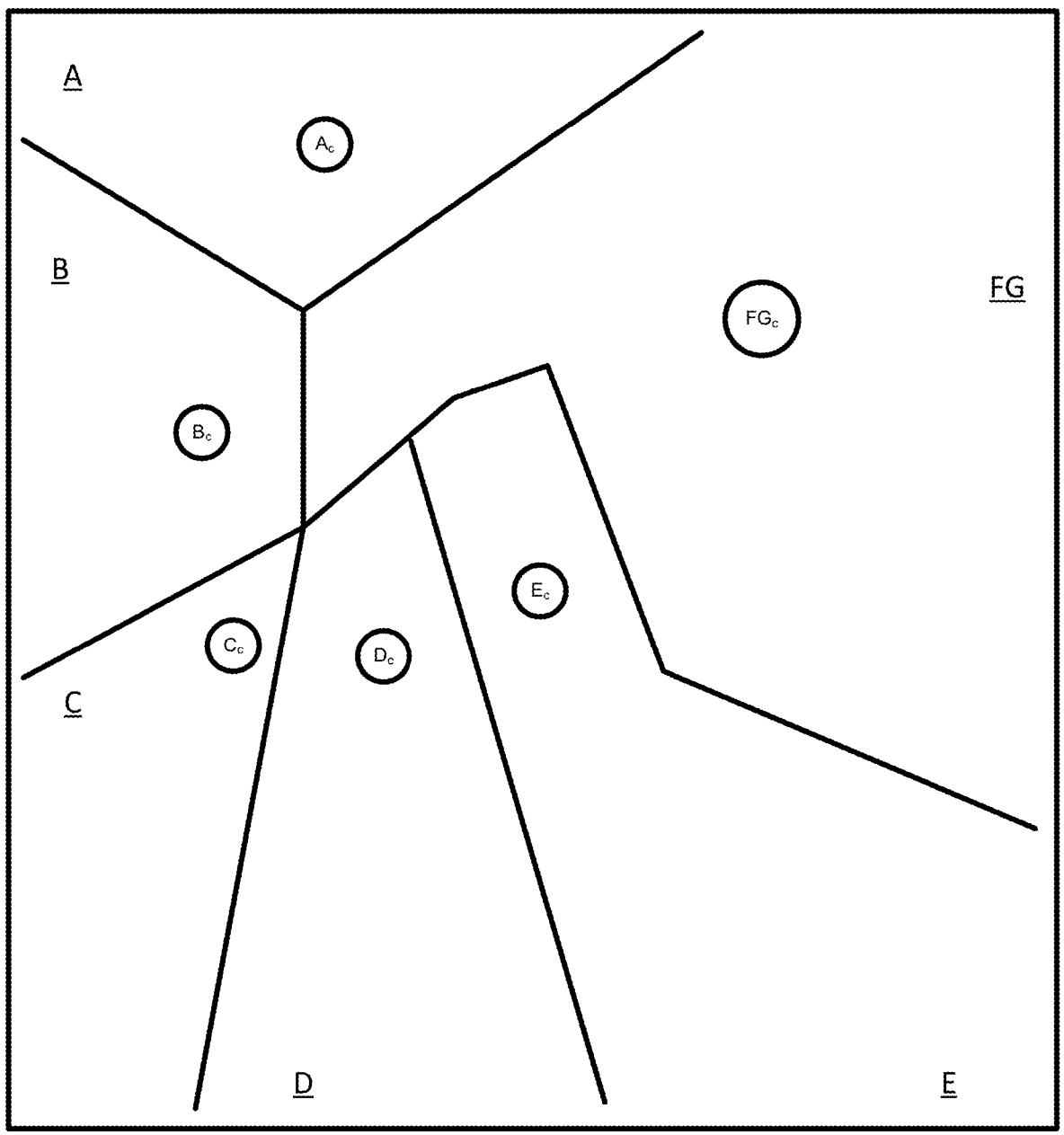
FIG. 9 illustrates another example merging of clusters.

Act S115 may also represent creating of new clusters through the process of splitting the clusters. In FIG. 7, the most distant centroids or centroid points are $C_F$ and $C_G$. Accordingly, in FIG. 9 clusters F and G are split or divided, through addition of a new centroid $FG_c$ calculated by the anonymity controller 121. The new centroid $FG_c$ may be determined as the midpoint along a line connecting the old centroids $F_c$ and $G_d$.

The anonymity controller 121 may access the centroid table 33 for removing clusters. The anonymity controller 121 may merge clusters based on the sorted data for pairs of clusters in the centroid table 33. The anonymity controller 121 may select the bottom O percentile or quantile clusters, as ranked by density or distance to and then remove the cluster centroid associated with a trajectory data count lowest among the pair. Examples for O include 2, 5, 10, 20 or another number. The anonymity controller 121 is configured to determine a new centroid as the midpoint of the cluster-pair centroids. The anonymity controller 121 may select, for any particular cluster point, the cluster point for another cluster that is farthest or has the greatest distance. The anonymity controller 121 may select the most distant pairs out of all of the cluster points. The least closest pairs of cluster points may also correspond to the sparsest clusters. Therefore, the anonymity controller 121 may split or divide a predetermined number or percentage of the most distant center points or sparsest clusters. Alternatively, the anonymity controller 121 may split or divide a predetermined number or percentage of subsets the most distant center points or sparsest. The subsets may be made up of a pair of clusters or a greater number of clusters.

Figure 10:
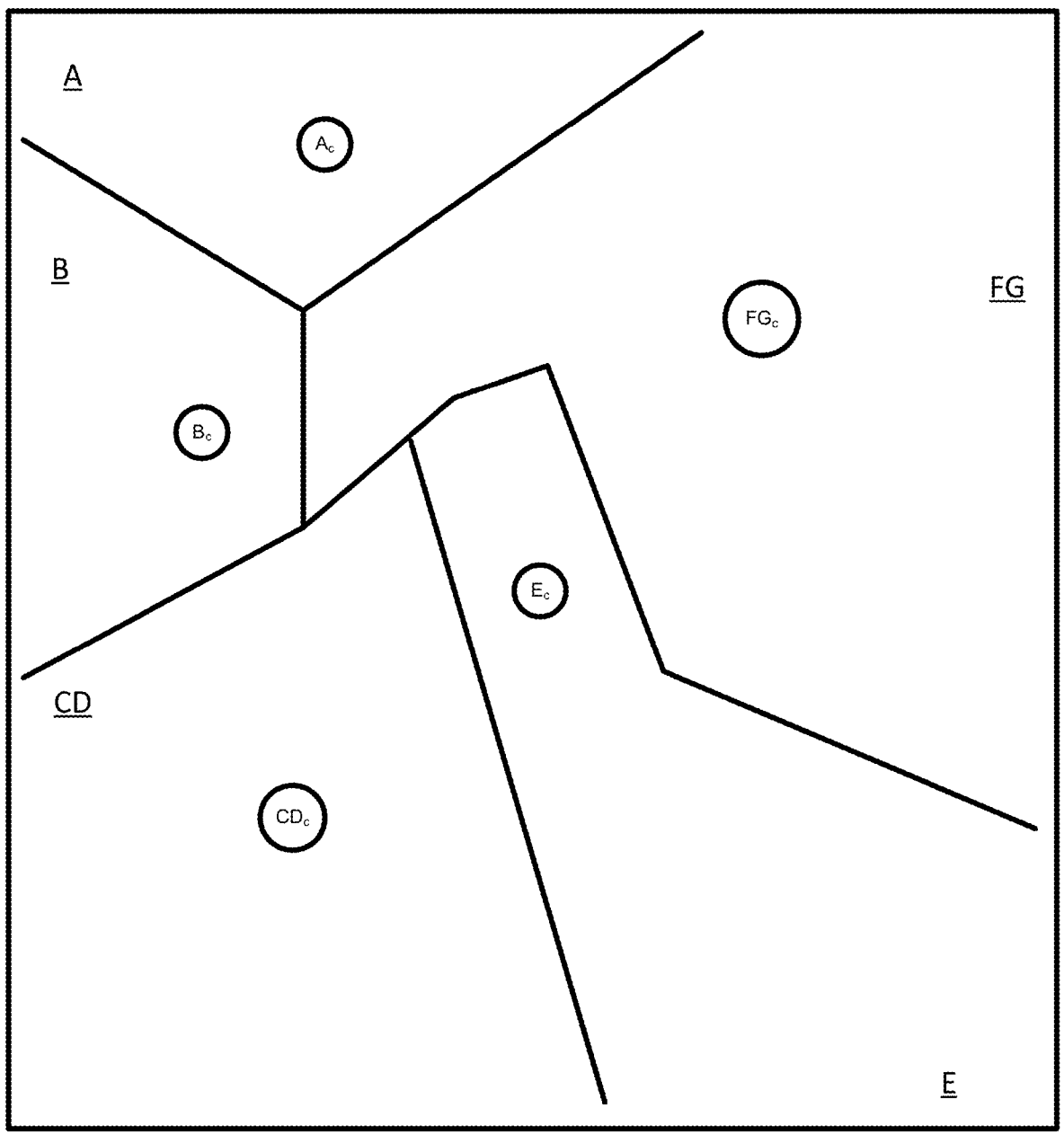
FIG. 10 illustrates another example merging of clusters.

In act S115, the points in the new arrangement of clusters may be not done as part of the merging or splitting, but rather assignment may be done for all points in the next iteration. The merge split optimization is not done during the final few iterations as dynamically changing cluster centroids disrupts optimal assignments and there by the quality of clustering. FIG. 10 illustrated an example in which clusters C and D have been merged and cluster F or G has been removed, effectively merging the data for clusters F and G to cluster FG.

Figure 11:
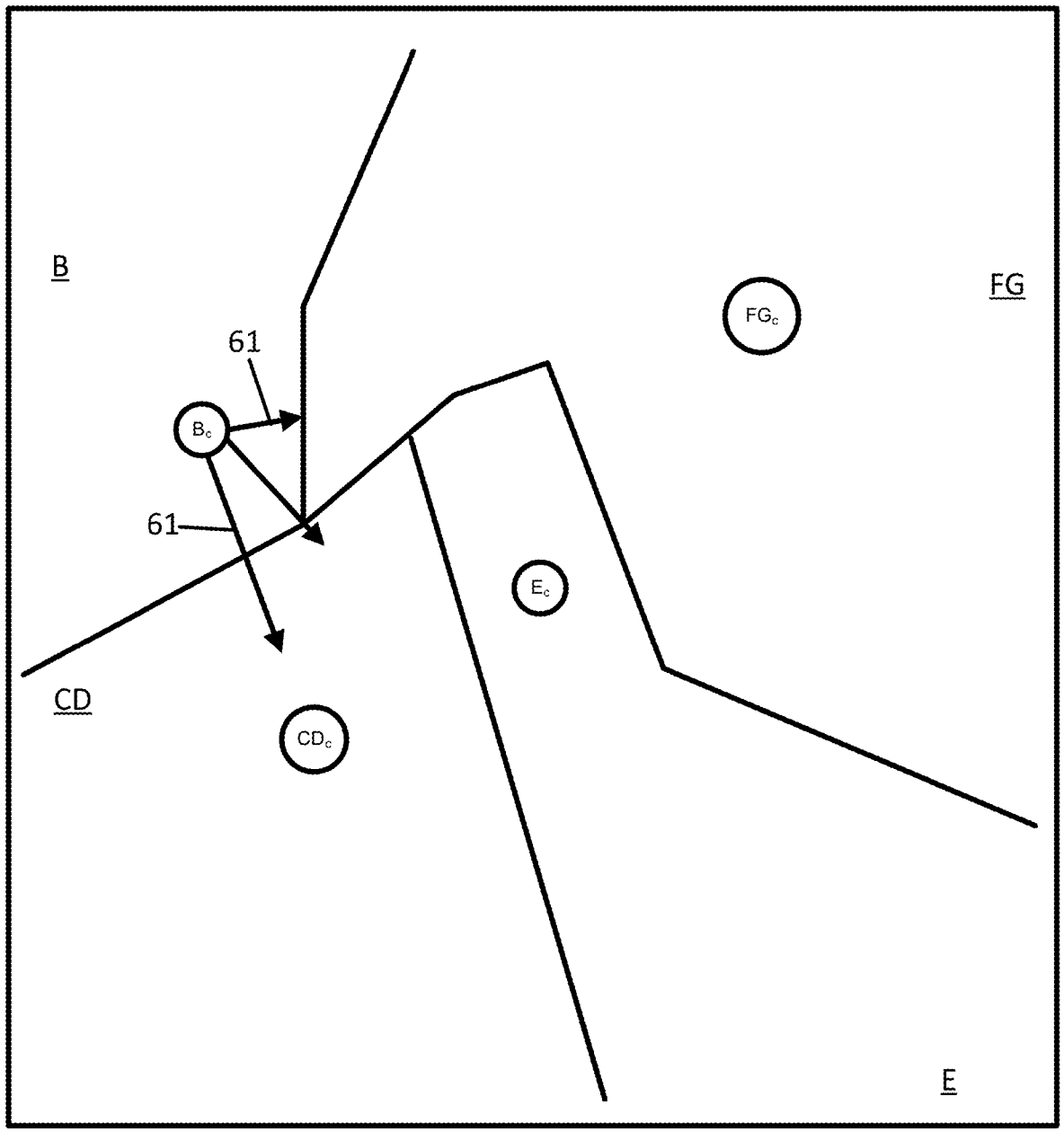
FIG. 11 illustrates cluster centroid weightings from neighboring clusters.

At act S117, the anonymity controller 121 through the clustering calculator 37 is configured to weight clusters according to the property of the cluster and also its neighboring clusters. The anonymity controller 121 may weight clusters based on the density of neighboring clusters. Act S117 may be performed before act S119 or after S121. FIG. 11 illustrates an example in which an iteration has already taken place to remove clusters A, which is explained in more detail below. The anonymity controller 121 may effective pull cluster centroids toward dense regions using weights. The anonymity controller 121 may calculate a weighting score based on the density of each cluster. The anonymity controller 121 tracks neighboring clusters by triangulating the cluster centroids. In each iteration, during maximization, the new centroid is calculated using the weighting score to take into account the neighbor centroids.

The anonymity controller 121 may calculate a neighborhood contribution or weighting score a according to Equation 3:

$$\alpha = \frac{\alpha_0}{1 + 10 * \text{iter}} \qquad \text{Eq. 3}$$

The term iter or iteration indicates that the score changes with increasing iterations until a maximum number of iteration is reached. The weighting score may be a decaying function according to the term iter. That is the effect of the weighting score may be lowered with increasing iterations. The anonymity controller 121 may calculate the new centroid using the weighting score and a weighted decay so that the influence on clustering is reduced during subsequent iterations as shown by Equation 4. The newly computed centroid N(C) is a combination of its previous value and the weighted centroid $W_{ci}$ of its neighbor centroids.

$$(x_c, y_c) = \frac{\alpha}{|C|} \Sigma_{(x_i,y_i) \in C} (x_i, y_i) + \frac{1-\alpha}{W} \Sigma_{(x_{ci},y_{ci}) \in N(C)} w_{ci} \cdot (x_{ci}, y_{ci}) \qquad \text{Eq. 4}$$

Figure 12:
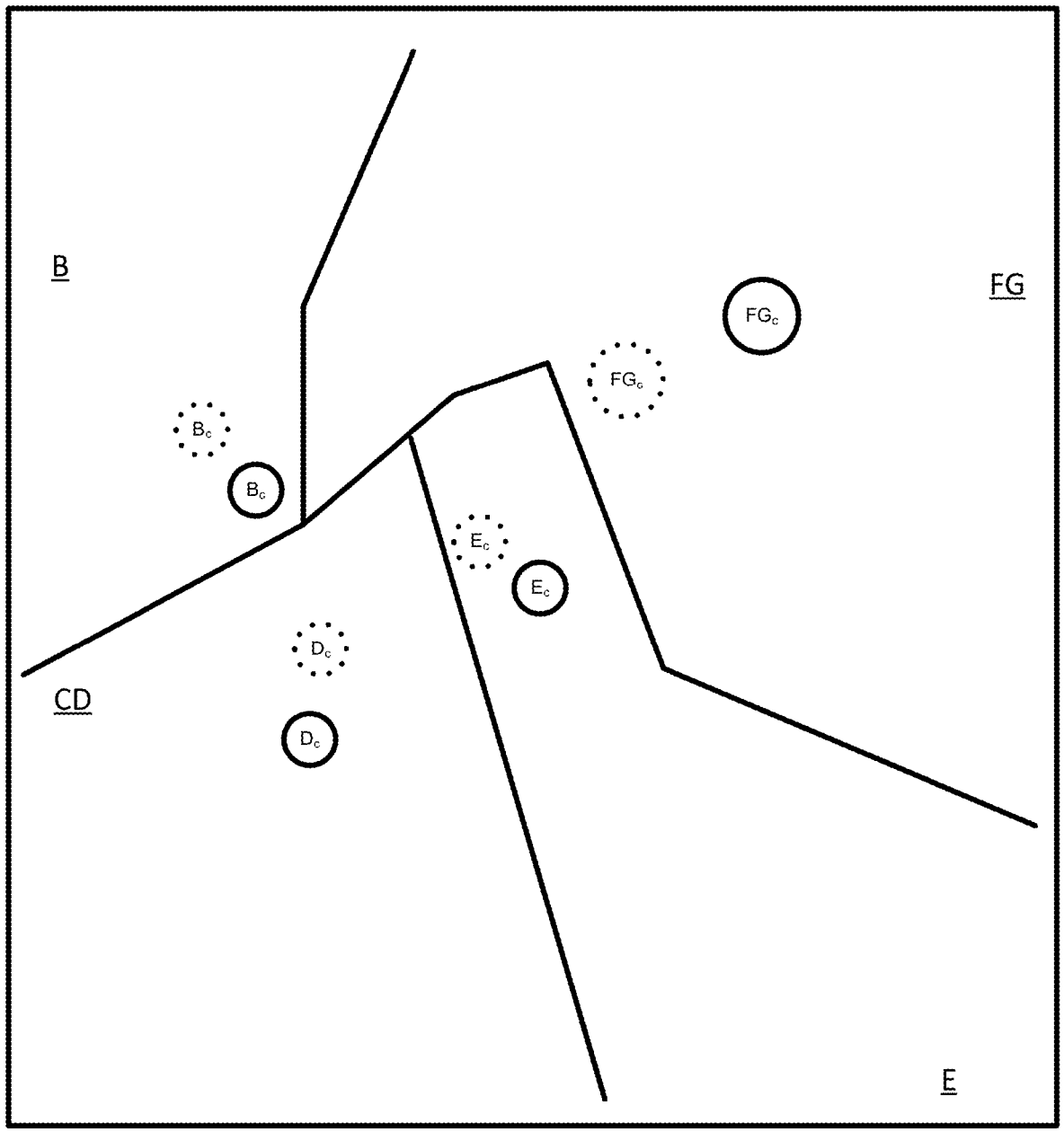
FIG. 12 illustrates a modification of cluster centroids.

As shown in FIG. 11, the centroid for cluster B is pulled or modified according to the weighting score from each of the other clusters, CD, E, and FG, which is represented by arrows 61. FIG. 12 illustrated modified locations for the centroids in response to the weighting score, as illustrated by dotted circles.

In act S119, the anonymity controller 121 is configured to count the trajectory data in the merged cluster and other clusters. The anonymity controller 121 counts the number of points or trajectories in each cluster and compares the count to a count threshold.

In act S121, the anonymity controller 121 is configured to remove clusters having a count less than the count threshold. Clusters with a count greater than the threshold are retained. FIGS. 11 and 12 illustrate an example in which cluster A has been removed as a result of the count of trajectory data for cluster being below the count threshold. The cluster removal raises distortion, but re-assignment of these points to closest clusters in successive iteration minimizes such increase in distortion. It might look like that the cluster splitting-merging sub step conflicts with the anonymization, but it should be emphasized that splitting is based on relative quantile information and the threshold is absolute. Also the splitting-merging is not performed for last few iterations, so the anonymization becomes more prominent.

In act S123, the anonymity controller 121 through the iteration calculator 39 is configured to determine whether the one or more stopping criteria has been met. The iteration calculator 39 may first identify the stopping criterion, which may be accessed from memory. The iteration calculator 39 is configured to analyze the latest iteration of clustering according to the stopping criterion.

The one or more stopping criteria may include a fixed number of iterations. For example, the number of times to repeat the assigning and merging clustering technique. Examples for the number of times may be 3, 4, 5, 10, or 20. In act S123, the iteration calculator 39 may increment an iteration count i (e.g., i=i+1). When the iteration count is less than the number of times to repeat the assigning and merging clustering technique, the stopping criterion is not met and the process proceeds to S111 to repeat some combination of S111, S113, S115, S117, S119 and S121. When the difference equals the number of times to repeat the assigning and merging clustering technique, the stopping criterion is met and the process proceeds to S125.

Other examples for the stopping criterion may include a difference in distortion threshold. The anonymity controller 121 may determine an amount of distortion in the result of the clustering technique. The amount of distortion is the mean distance between each point to its cluster centroid, averaged for all the clusters. The difference in distortion of successive iterations are computed and if it is below a threshold, the stopping criterion is met.

In act S125, the anonymity controller 121 is configured to output anonymized trajectory data. The anonymity controller 121 may modify the trajectory data to provide the predetermined level of anonymity to locations from the trajectory data in response to the merged cluster. More specifically, the anonymity controller 121 may generate a message or a database including the locations for the trajectory data determined after S121 (e.g., the new locations for the centroids in FIG. 12). In other words, all of the data for a cluster may be assigned to the location of the centroid. Thus, in the simplified example illustrated here all of the sampled data 51 is outputted having only the locations in FIG. 12 including $B_c$, $D_c$, $E_c$, and $FG_c$.

The anonymized data 40 may be a set of data provided to a location based application for a mobile device 122 or other computer. The anonymized data 40 may provided for analysis by the server 125 in providing the location based application.

For example, the external service 41 may be a navigation application or mapping application in which routing or positioning information is provided to the mobile device 122. The location of the mobile device 122 may be anonymized after being sent to the server 125 and location based features in the navigation or mapping application may be provided to the user based on the anonymized data. Similarly, information on other users such as the number of visits to one or more POIs, or the most traveled path of a route may be provided to the mobile device 122 based on the anonymized data of the other users.

In another example, the external service 41 may be a traffic provider. The traffic information such as the real time average speeds on or more road segments may be determined from the anonymized data 40. The anonymized data 40 may also be provided to the mobile device 122 after the location of the mobile device has been anonymized.

In another example, autonomous driving or assisted driving applications may utilize the anonymized data 40. The external service 41 may be a remote service that controls or provides instructions to autonomous vehicles or assisted driving vehicles. Routes may be provided to these vehicles based on other routes traveled and included in the anonymized data 40.

Segment Neighborhood Based Clustering

Existing trajectory clustering approaches assume that trajectories are best represented as a sequence of points. In reality, these points are just sampled instances of the underlying curve and hence an approximation of the actual trajectory. A technique which better approximates the underlying data can get to improved clustering quality there by better anonymization. The following embodiment for segment neighborhood based clustering includes a sequence of operation that includes (1) initializing the data structures; (2) perform an iterative process that until anonymization criteria are satisfied includes (a) centrality computation, (b) relocation of points based on centrality, and (c) anonymization at the point level; and (3) return anonymized points. As explained in further detail below, the procedure starts with initializing the data structures that represent the trajectories in such a way that is suitable for clustering. The data structure optimizes the points iteratively such that similar segments in the trajectories are clustered together by relocating and grouping together sparse zones. The grouping requires identification of neighborhood with high density and weighing them, utilizing graph centrality. The computed centrality information is used to relocate points to bring similar segments closer. The relocated points are further grouped together, so that each group has at least a predetermined number (K) of elements.

Figure 13:
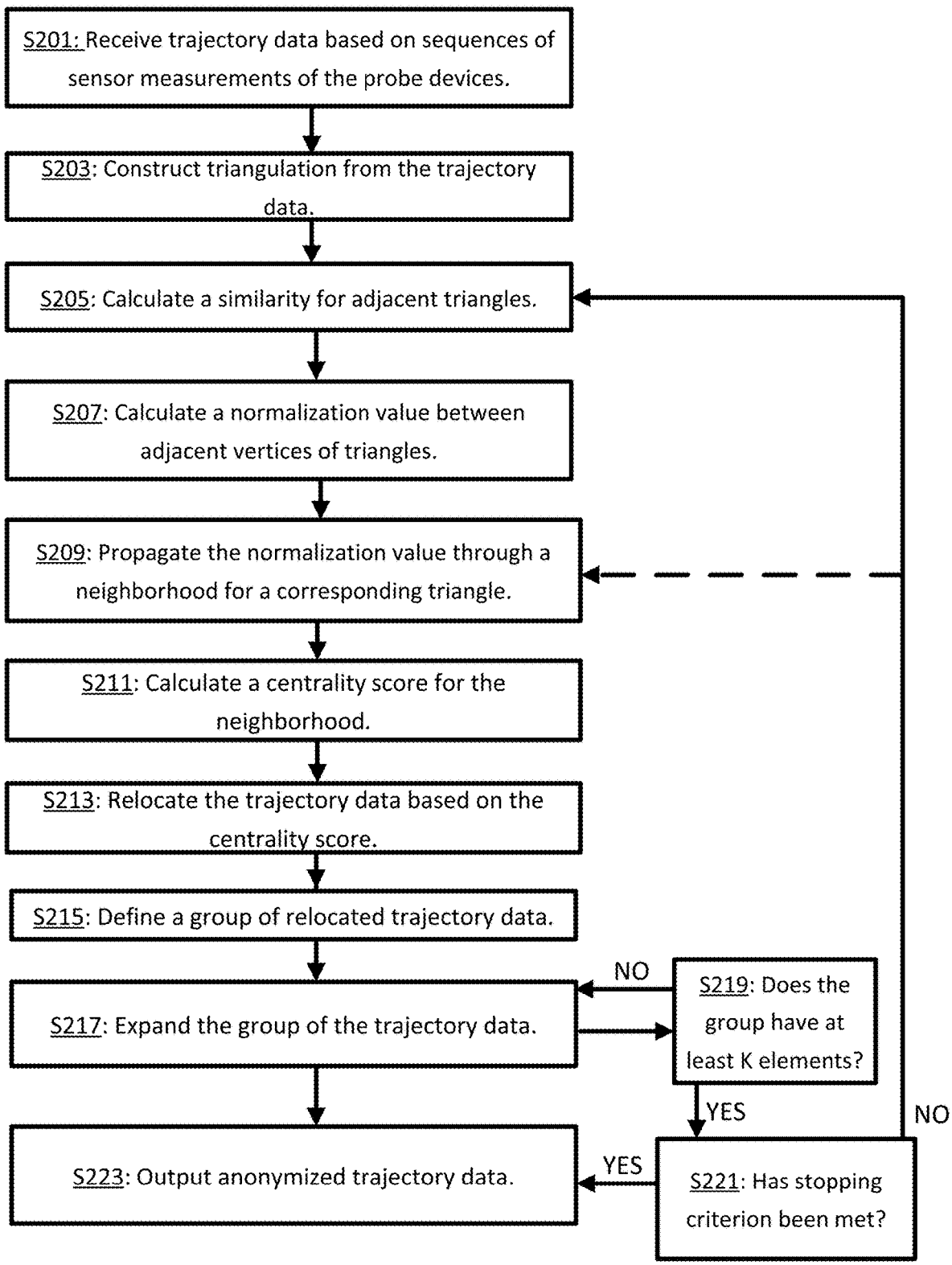
FIG. 13 illustrates a flow chart for a triangulation technique for providing anonymity.

FIG. 13 illustrates a flow chart for providing anonymized trajectory data using the central server 125. The acts of FIG. 13 may be performed in the order presented or in another order. One or more of the acts of FIG. 13 may be repeated or omitted. Other acts may be included. The acts of FIG. 13 may be performed by the server 125 such as the anonymity controller 121 using the triangulation calculator 38 and the iteration calculator 39. Alternatively, the acts of FIG. 13 may be performed by the mobile device 122 or a combination of the server 125 and the mobile device 122.

Figure 14:
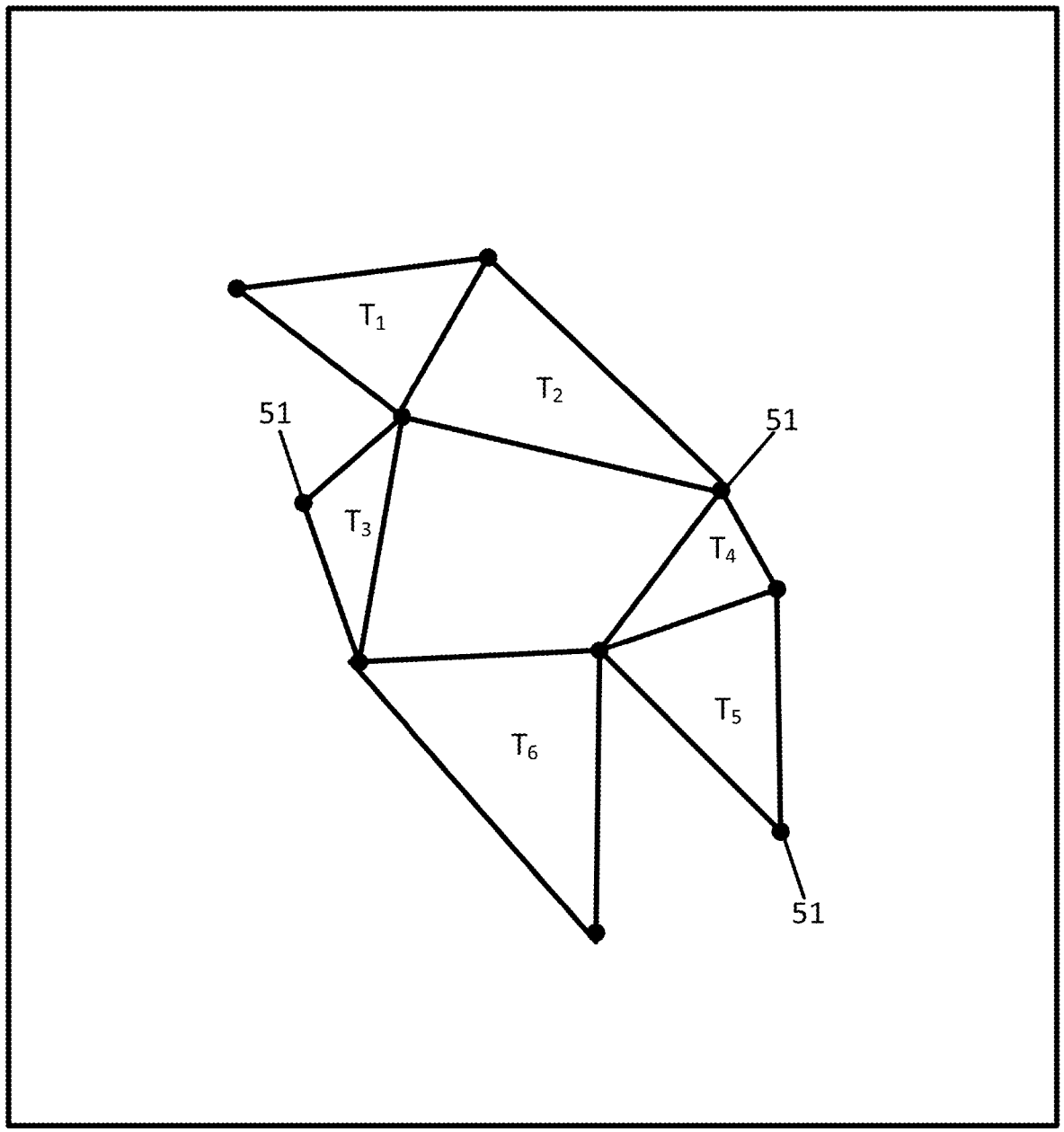
FIG. 14 illustrates an example triangle geometrical representation of trajectory data.

FIG. 14 illustrates an example trajectory data for another partition-based clustering technique using triangulation. The sampled points 51 are connected in triangles $T_1$-$T_6$. according to a triangulation technique. The sampled points 51 are illustrated as much less dense for the purpose of illustration. A denser set of sampled points 51, as shown in FIG. 5 would include hundreds of triangles.

In act S201, the anonymity controller 121 receives probe data from one or more probes 101a-n or the database 123. The probe data includes trajectories as sequences of measurements of the probes. The probe data, or sampled points 51, are illustrated in an arrangement that is geographically spaced. The probe trajectory data may be received from a database that stores the trajectory data based on sequences of sensor measurements of the probe devices 101.

The initialization process may include a triangulation technique, such as the Delaunay triangulation process. In act S203, the anonymity controller 121 through the triangulation calculator 38 is configured to calculate triangles from the trajectory data. Each of the triangles is defined by vertices. The triangles are constructed such that a theoretical circle that is circumscribed around and intersecting the vertices includes no additional trajectory data. That is, the triangles that represent the trajectory data are drawn using adjacent sampled points 51 such that no other sampled points 51 lie within a circle drawn through the vertices. The interior of the circle is free of the trajectory data other than the sampled points 51 assigned to the vertices. The anonymity controller 121 through the triangulation calculator 38 connects the vertices so the interior of the plurality of triangles is free of the trajectory data other than the points assigned to the vertices.

Figure 15:
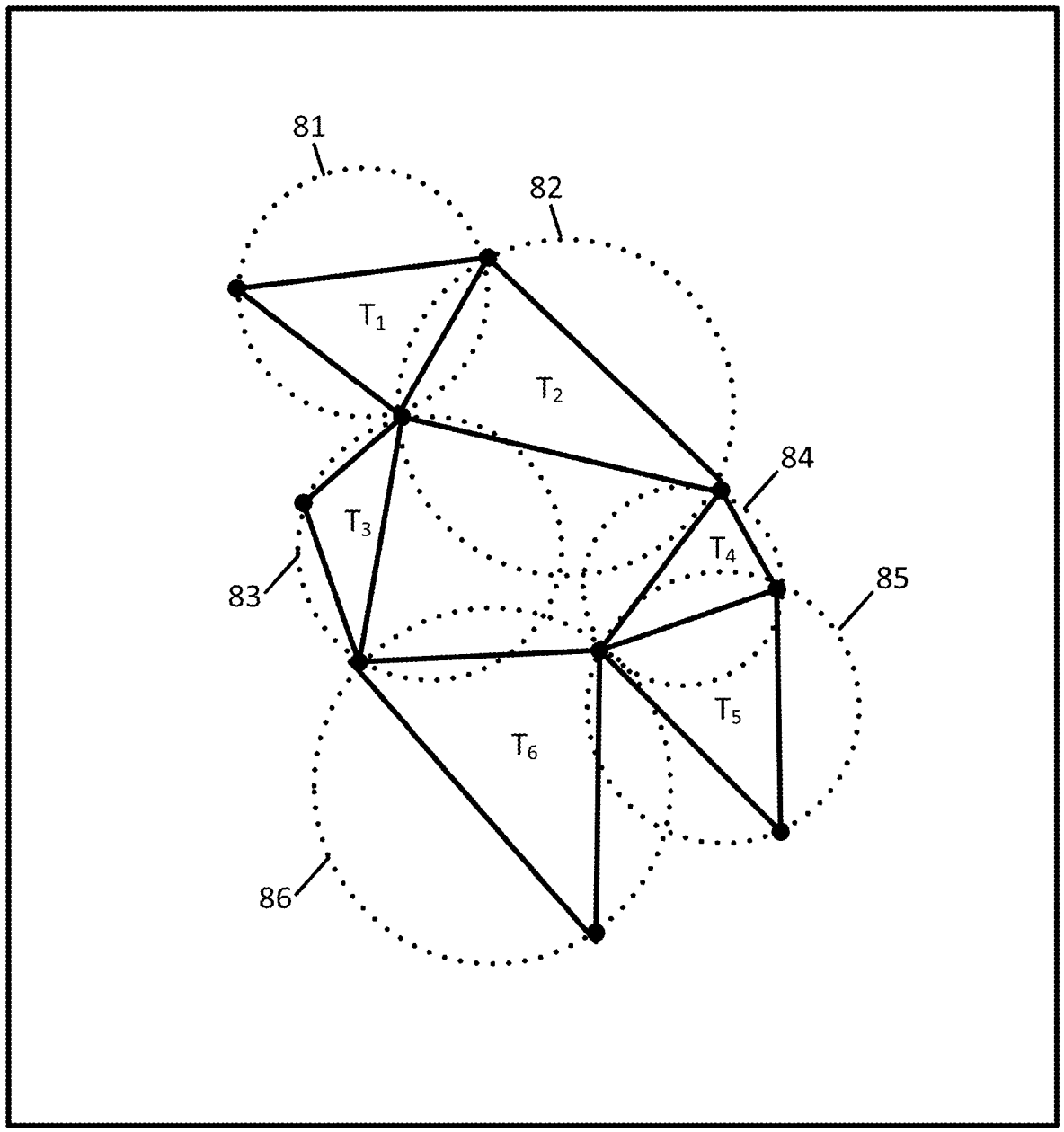
FIG. 15 illustrates circumscription of circles for the example triangle geometrical representation.

FIG. 15 illustrates circle 81 circumscribing triangle $T_1$, circle 82 circumscribing triangle $T_2$, circle 83 circumscribing triangle $T_3$, circle 84 circumscribing triangle $T_4$, circle 85 circumscribing triangle $T_5$, and circle 86 circumscribing triangle $T_6$.

The anonymity controller 121 through the triangulation calculator 38 is configured to calculate the triangles from the trajectory data. Specifically, points in the trajectory data are assigned to the vertices of at least one of the triangles. In some examples, all of the sampled points 51 may be assigned to vertices. In other examples, the sampled points 51 may be filtered or otherwise limited. Points for the assignment to the vertices may be selected randomly. The points for the assignment to the vertices may be selected in certain time intervals. That is, for each trajectory, the sampling time interval is adjusted to reduce the number of sampled points 51. In another examples, certain types of trajectories may be selected for the sampled points 51 used in the vertices of the triangles. For example, only trajectories longer than a threshold length are selected.

The triangulation technique for defining the triangles may comprise the Delaunay triangulation or a constrained Delaunay triangulation. The triangulation technique may maximize the minimum angle of all the angles of the triangles in the triangulation.

The constrained Delaunay triangulation (CDT) may define each trajectory data point as a vertex in the triangulation. Points that are spatially closer to a given point are connected by an edge in the triangulation. The edge is illustrated as a side of a triangle. Together, for any selected vertex, the other points for vertices of the triangle are considered as the neighborhood of the selected vertex.

The constrained Delaunay triangulation includes at least one constraint. The at least one constraint may include the line segments $((x_i, y_i), (x_{i+1}, y_{i+1}))$ in the trajectories. It means, in the triangulation technique, an edge leads to either neighborhood relation or trajectory continuity information. The introduced constraints differentiate this embodiment from other triangulation techniques because the trajectory semantics are preserved by keeping the segments intact. Meanwhile, the triangulation technique also maintains edges that connect nearest neighbors for any given point and use it as the underlying data structure for clustering. The neighborhood information is used in computation of centrality score of each point in the trajectory and then use the centrality score of its neighborhood to relocate a given point.

The edge table 34 includes the data for the edges of the triangles that describes the set of trajectory data. The edge table 34 may include the coordinates for the vertices of the triangles as sets of two adjacent points in a trajectory is connected by an edge in the triangulation. The edge table 34 is modified according to the following examples.

At act S205, the anonymity controller 121 through the triangulation calculator 38 is configured to calculate a similarity for adjacent triangles. The similarity may be a similarity score for the vertices based on trajectory data associated with adjacent vertices. A weight-directed neighborhood graph is constructed from the triangulation. Equation 5 defines a weight ($\mathcal{S}$) to represent similarity between two vertices. The similarity matrix may have coefficients according to i and j with i representing a first dimension in the matrix and j representing a second dimension in the matrix. The weights may be stored in a similarity matrix having values for each point in the trajectory data. The function $\mathcal{D}$ may be Euclidean distance or another distance. The constant beta β represents a factor to offset sensitivity of the inverse operation. The addition of beta ensures that probe points belonging to the same road segment are not penalized. For example two probe points separated by 1 meter have similarity of ½ if beta is 1 which is very low, compared to almost 1 when beta is 50. Beta may be determined by estimating the distribution of distance amount probe points.

$$\mathcal{S}_{(i,j)} = \beta/(\beta + \mathcal{D}((x_i,y_i),(x_j,y_j))) \qquad \text{Eq. 5}$$

In act S207, the anonymity controller 121 through the triangulation calculator 38 is configured to calculate a normalization value between adjacent vertices of triangles. The weights are normalized by out links or edges that connect to adjacent vertices, so that the contribution of each vertex is proportionally equal. The weights are then propagated through the neighborhood so that there is a convergence of weights throughout the graph. The anonymity controller 121 through the triangulation calculator 38 is configured to select, for each vertex, the similarity score from the selected vertex to each of the neighboring vertices. The neighboring vertices are the that are connected to an edge to the selected vertex, as specified in the edge table 34. The similarity score to each vertex is divided by the sum of similarity scores. The sum of the similarity scores for each vertex add up to 1.

In act S209, the anonymity controller 121 through the triangulation calculator 38 is configured to propagate the normalization value through a neighborhood for a corresponding triangle and may be propagated further through adjacent triangles. The similarity matrix having similarity values for the vertices or trajectory data may be multiplied one or more times with a unit vector. For each vertex, the similarity scores from the three neighboring vertices are added together as a weight for the given vertex. Thus, the weights propagate through the neighborhoods of vertices of the triangles.

In act S211, the anonymity controller 121 through the triangulation calculator 38 is configured to calculate a centrality score from the convergence of weights throughout the graph. The centrality score may be the value of the summed weights that has reached convergence. The anonymity controller 121 through the triangulation calculator 38 may monitor the weights for the vertices as the values propagate and converge. Convergence is measured by computing the difference between the newly computed centrality scores and the previous one and finding absolute deviation sum. This difference goes down over multiple iterations, which shows convergence.

Figure 16:
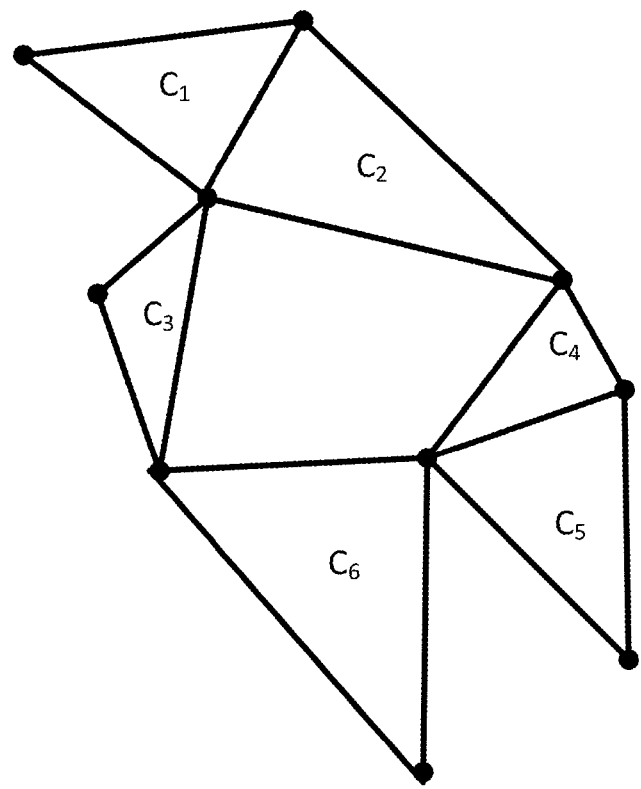
FIG. 16 illustrates centrality scores for the example triangle geometrical representation.

The centrality score quantifies influential vertices in a graph. Influential vertices are those points that are in high dense regions highlighted from points in low dense regions. FIG. 16 illustrates centrality scores $C_1$-$C_6$ for each of the triangles $T_1$-$T_6$. At least one vertex in modified response to the similarity score.

The weight normalized neighborhood graph can be considered as the transition matrix in a Markov chain model and the converged score is the stationary distribution of the Markov chain. The stationary distribution is also the principal Eigen vector of the transition matrix. For an aperiodic and irreducible Markov chain such as in the graph, the existence of stationary distribution is guaranteed. Hence this stationary distribution corresponds to the centrality score we just mentioned. Actual computation of the score is achieved by representing the graph as a sparse adjacency matrix (transition) and using power iteration method. The method is incidentally used to compute Eigen vectors.

In act S213, trajectory data is modified based on the centrality score. Each vertex in the triangulation data structure is relocated by computing the centrality weighted centroid computed based on its neighborhood vertices. The neighborhood vertices also include preceding and succeeding points of the given point in the trajectory, captured as constraints. Points in dense regions become attractor zones and the points in sparser regions are progressively pushed towards such dense regions. The line-segment constraints make sure that trajectory semantics are preserved as well.

Equation 6 provides:

$$(x, y) = \frac{1}{\sum_{c \in \mathcal{N}(\overline{c})} w(c) \mathcal{D}((x_i, y_i), (x_c, y_c))} \quad \text{Eq. 6}$$

$$\sum_{c \in \mathcal{N}(\overline{c})} w(c) \mathcal{D}((x_i, y_i), (x_c, y_c))(x_c, y_c)$$

In act S215, the anonymity controller 121 through the triangulation calculator 38 is configured to define a group of relocated trajectory data. The group may be a single triangle. The triangle may be selected randomly. In other examples, the largest triangle or the smallest triangle may be selected. The anonymity controller 121 through the triangulation calculator 38 is configured to compare the triangles and selected the triangle having a predetermined property. The triangle may be selected from user input. The selected triangle includes three vertices, which correspond to three trajectory points.

In act S217, the anonymity controller 121 through the triangulation calculator 38 is configured to expand the group of the trajectory data and expand the selected triangle to an expanded shape. The anonymity controller 121 through the triangulation calculator 38 is configured to is configured to count the trajectory data in the expanded shape. The count is the number of sampled points 51 that fall within the expanded shape. The anonymity controller 121 through the triangulation calculator 38 is configured to compare the count of the trajectory data in the expanded shape to a threshold. The geographic locations are applied to the trajectory data in the expanded shape.

In act S219, the iteration calculator 39 determines whether the group has at least K elements. Examples for K includes 4, 6, 8, 10, or another value. The value for K may be determined by a user input. The value for K may be determined based on the geographic area or the types of road segment (e.g., functional classification associated with the trajectory).

In act S221, the iteration calculator 39 determines whether the one or more stopping criteria have been met. The iteration calculator 39 is configured to identify a stopping criterion. The stopping criteria may be based on a difference between one or more current locations for vertices and the previous values for the corresponding vertices. Thus, the stopping criteria may include a value that is compared to the differences between all of the current vertices and all of the previous vertices. Alternatively, the stopping criteria may include a value that is compared to the differences between a selected neighborhood in the of the current vertices and all corresponding previous values for the neighborhood of vertices. Alternatively, the stopping criteria may include a value that is compared to the differences between a selected vertex and the corresponding value for the selected vertex.

When the difference is greater than a threshold, the at least one stopping criteria is not met and the process proceeds to S205 to repeat S205 through S217, or alternatively, S209 through S217 (as shown with dotted lines). When the difference is less than the threshold, the at least one stopping criteria is met and the process proceeds to S223.

Alternatively, at least one stopping criteria may be based on the number of iterations determined by the iteration controller 39. The initialization criterion may be a number for a first iteration threshold. For example, the number of times to repeat the centrality score calculation and/or normalization. Examples for the number of times may be 3, 4, 5, 10, or 20. In act S109, the anonymity controller 121 through the iteration calculator 39 may increment an iteration count i (e.g., i=i+1). When the iteration count is less than the number of times to repeat the centrality score calculation and/or normalization, the at least one stopping criteria is not met and the process proceeds to S205 to repeat S205 through S217, or alternatively, S209 through S217 (as shown with dotted lines). When the difference equals the number of times to repeat the initial clustering technique, the initialization criterion is met and the process proceeds to S223. Alternatively, at least one stopping criteria may be based on distortion.

Even though, the points that are relocated are brought closer together, no clustering is done explicitly. Enforcing K anonymity requires grouping them to enable counting. To achieve this in the current embodiment, the grouping of points iteratively using the concept of union-find. In the beginning, all the points are considered as a cluster by itself with count and progressively expand the cluster. At each iteration, after relocation, we iterate through points, to track points that belong to a cluster of size less than K. These clusters are grouped to the next available closest cluster. Closeness between two clusters is based on single-link, i.e. closest point pairs among the two clusters in terms of distance. The progressive merging of points is restricted only to clusters with counts less than K, to ensure that each cluster has at least K points. Progressive merging also makes sure that the relocation phase brings points that has to be clustered together are brought closer. The score computation, relocation based on scores and group based anonymization phases are done for a number of iterations until the stopping criteria is met. In our case, the stopping criteria is a fixed number of iterations, but there are criteria such as reduction in distortion on successive iterations falling below a threshold.

The anonymity controller 121 through the triangulation calculator 38 may assign geographic locations to the trajectory data. The assignment may occur before the one or more iterations of expansion in S215 and S217. The assignment may occur after the one or more iterations of expansion in S215 and S217. The anonymity controller 121 through the triangulation calculator 38 may determine how the trajectory points for different vertices are modified according to the centrality score of other vertices. In general, high centrality scores impact the location of other vertices more than low centrality scores.

Figure 17:
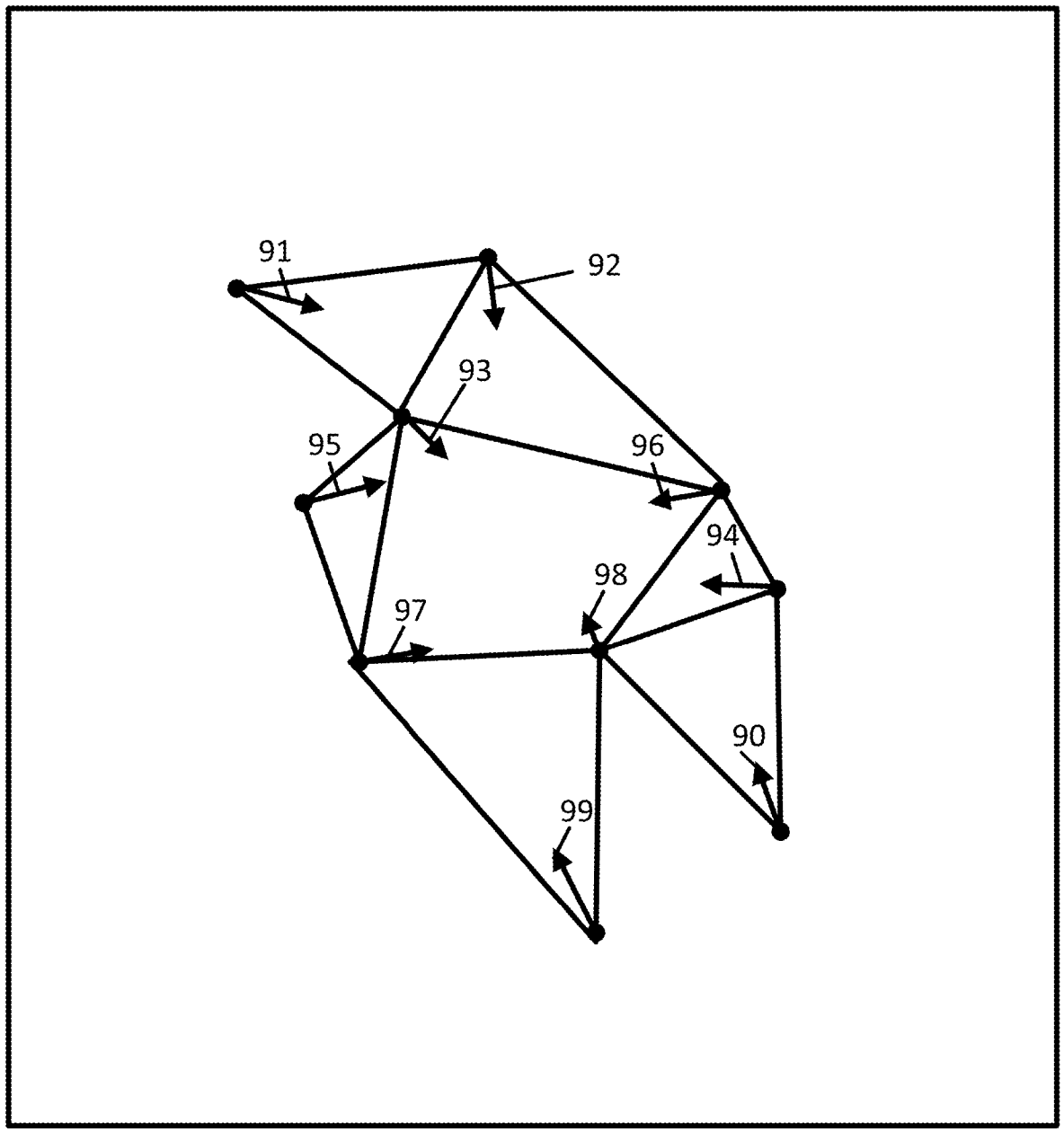
FIG. 17 illustrates relocation paths for the example triangle geometrical representation.

The anonymity controller 121 is configured to define at least one attractor point (e.g., attractor trajectory point or attractor vertex) for at least one of the triangles. The anonymity controller 121 may compares the centrality scores to a threshold and define attractor points as those vertices with centrality scores above a threshold. The anonymity controller 121 modifies the geographic locations of one or more other trajectory points or vertices based on the locations of the attractor points to shift the other trajectory points or vertices toward the attractor points in proportion to the relative size of the centrality scores. FIG. 17 illustrates the modification of the vertices of the triangles in response to the weights. The arrows 90-99 illustrate the magnitude of the weight and the modification.

Figure 18:
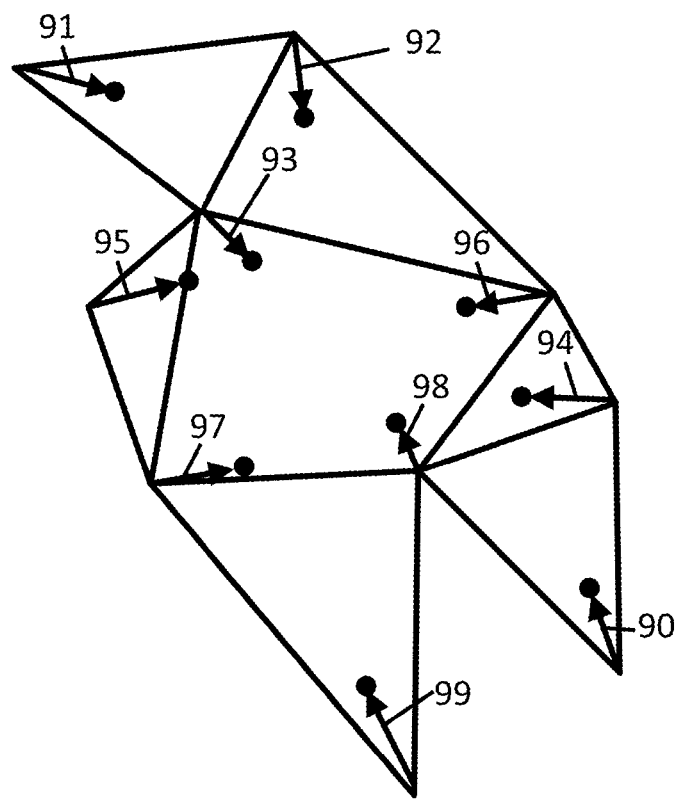
FIG. 18 illustrates modified locations for the trajectory data.
Figure 19:
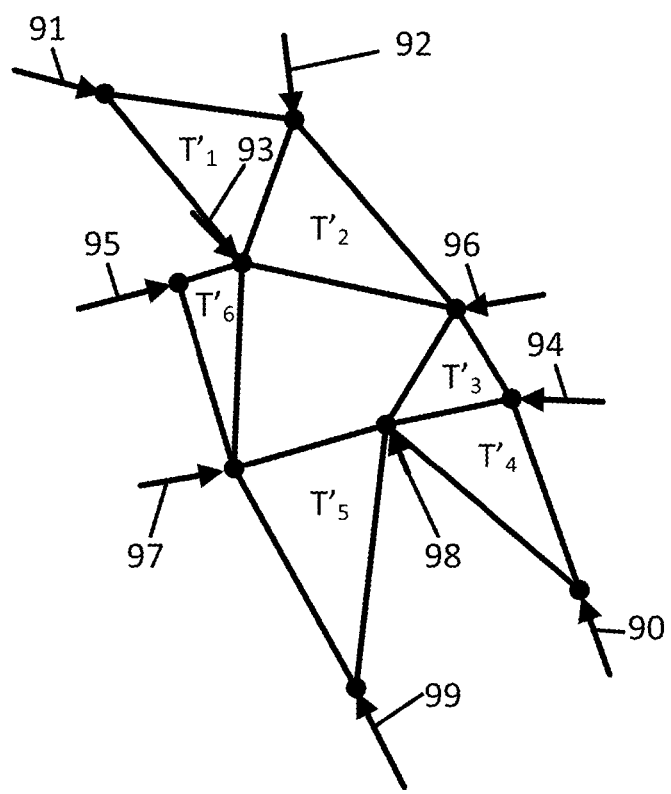
FIG. 19 illustrates resizing of the triangle geometrical representation.

In act S223, the anonymity controller 121 outputs anonymized trajectory data. The anonymity controller 121 is configured to assign geographic locations based on the modification from attractor points. Thus, the anonymity controller 121 modifies the trajectory data according to the centrality score. FIG. 18 illustrates the new vertices locations, and FIG. 19 illustrates new triangles drawn with the modified vertices.

The anonymity controller 121 provides the geographic location (e.g., anonymized data 40) to the location-based service. The anonymized data 40 may be a set of data provided to a location based application for a mobile device 122 or other computer. The anonymized data 40 may provided for analysis by the server 125 in providing the location based application.

For example, the external service 41 may be a navigation application or mapping application in which routing or positioning information is provided to the mobile device 122. The location of the mobile device 122 may be anonymized before being sent to the server 125 and location based features in the navigation or mapping application may be provided to the user based on the anonymized data. Similarly, information on other users such as the number of visits to one or more POIs, or the most traveled path of a route may be provided to the mobile device 122 based on the anonymized data of the other users.

In another example, the external service 41 may be a traffic provider. The traffic information such as the real time average speeds on or more road segments may be determined from the anonymized data 40. The anonymized data 40 may also be provided to the mobile device 122 after the location of the mobile device has been anonymized.

In another example, autonomous driving or assisted driving applications may utilize the anonymized data 40. The external service 41 may be a remote service that controls or provides instructions to autonomous vehicles or assisted driving vehicles. Routes may be provided to these vehicles based on other routes traveled and included in the anonymized data 40.

Simplification and Segmentation

The following techniques may be applied to the trajectory data in any of the disclosed embodiments. The pipeline includes (1) trajectory simplification, (2) clustering, and (3) segmentation to enforce exact K-anonymity.

The trajectory simplification is done from a line simplification point of view, rather than stop-turn approach, taking into account of the inherent noise in the data source and variation in sampling frequency. An important phase is the data clustering that ensures exact K-anonymity at point level and approximate anonymity at trajectory level as a sequence of points can be seen as permutation of these points and the count of these sequences will be always lower than the count of the points that are used to construct these sequences.

Segmentation of trajectories may be performed to enforce the K-anonymity at sequence level. Exact K-anonymity property is enforced from lower level such as points or segments. A prefix tree based segmentation of trajectories is iterative and makes sure that segmented sub-trajectories are exactly K-Anonymous.

Trajectories are represented by sample instances and the sampling frequency is variable across data sources. It need not be a constant within a dataset when taking into account of other factors such as capturing device type, various errors, user settings, or another factor. Also trajectories with high frequency sampling might lead to oversampling and over-representation of those instances. To take care of these factors, the trajectories are resampled to simplify the trajectory. Resampling is done by using line simplification, as the samples are just representative of curve, which in turn is approximately modeled as a sequence of line segments.

The algorithm simplifies a curve by removing representative points of the curve which is guided by a cost factor and stop condition. The cost function computes the error induced by directly linking adjoining vertices of each sample points. This simulates the effect of removing the sample under consideration. The stop condition limits the amount of error induced be removing the points from trajectory.

Application of simplification leads to simpler representation that are crowded towards intersections and road curves. These samples from individual trajectories leads to concentration of points at spatially close locations, as the trajectories are constrained by underlying road geometry. This property helps the quantization that follows simplification.

Regarding segmentation, the Clustering method described above only ensures K-anonymity at point level, where exact K-anonymity of the entire sequence of points is desired. This requires efficient counting of the point sequence to enforce the criteria. A prefix tree structure is used to maintain the counts of the sub-sequence and transform the prefix tree in such a way that exact counts of the entire trajectory is at least K.

The prefix tree is an ordered data structure that can efficiently manipulate sequential data composed of homogeneous elements. Each node $N(E, \{(N_s, V_s)\}_1^S)$ contains an element and maps to successive elements [1,S] in the sequence along with associative values $V_s$, starting from the node. Hence a given node along with its parent corresponds to a subsequence in the input data. Prefix tree are usually used as an associative data structure and in our case, the value V is the occurrence count. Prefix trees are used to do partial search of subsequence and using the count to segment a given sequence into set of subsequences. Each trajectory $t_u$ is considered as a sequential data, where points (x, y, t) in the trajectory corresponds to elements is the prefix tree.

The segmentation is of three steps: tree construction, count based tree trimming and splitting the trajectory using trimmed tree. The tree construction procedure is similar to regular method, where each trajectory is sequentially inserted into the tree starting from the root node and traversing the tree to insert each point into appropriate node. If a point is already present at a given level, its count is incremented. The tree structure is long and skinny given the sparseness of the trajectories dataset. Hence for an optimal segmentation, it has to cut-off on levels with counts lower than K and the trimmed portion has to be re-inserted to make sure that it is considered as a separate sub-trajectory. The trimming and re-insertion is carried out until the trimmed nodes at successive iterations are identical. In such a case, it is not possible to optimize the tree further and hence considered as a stopping criterion.

Once the prefix tree is optimized by trimming and re-inserting, the given trajectory $t_u$ is segmented by doing a partial search sequentially on the tree. When it reaches a leaf node at level l, it signifies that the support count for next point $(x_{l+1}, y_{l+1}, t_{l+1})$ in the sequence is lower than K in the original data and hence the subsequence until the given point $<(x_1, y_1, t_1) \ldots (x_l, y_l, t_l)>$ is considered as a separate trajectory. It should be noted that the count of sub-trajectory is at least K, based on the prefix tree. Thus the $t_u$ is splitted into two sub trajectories: $<(x_1, y_1, t_1) \ldots (x_l, y_l, t_l)>$ and $<(x_{l+1}, y_{l+1}, t_{l+1}) \ldots (x_n, y_n, t_n)>$. Now, the sub-trajectory $<(x_{l+1}, y_{l+1}, t_{l+1}) \ldots (x_n, y_n, t_n)>$ is considered as a new trajectory and a partial search is performed for this sub-trajectory. The splitting and partial searching is performed until end of points is reached for the given trajectory.

Other Application of the Anonymized Data

Figure 20:
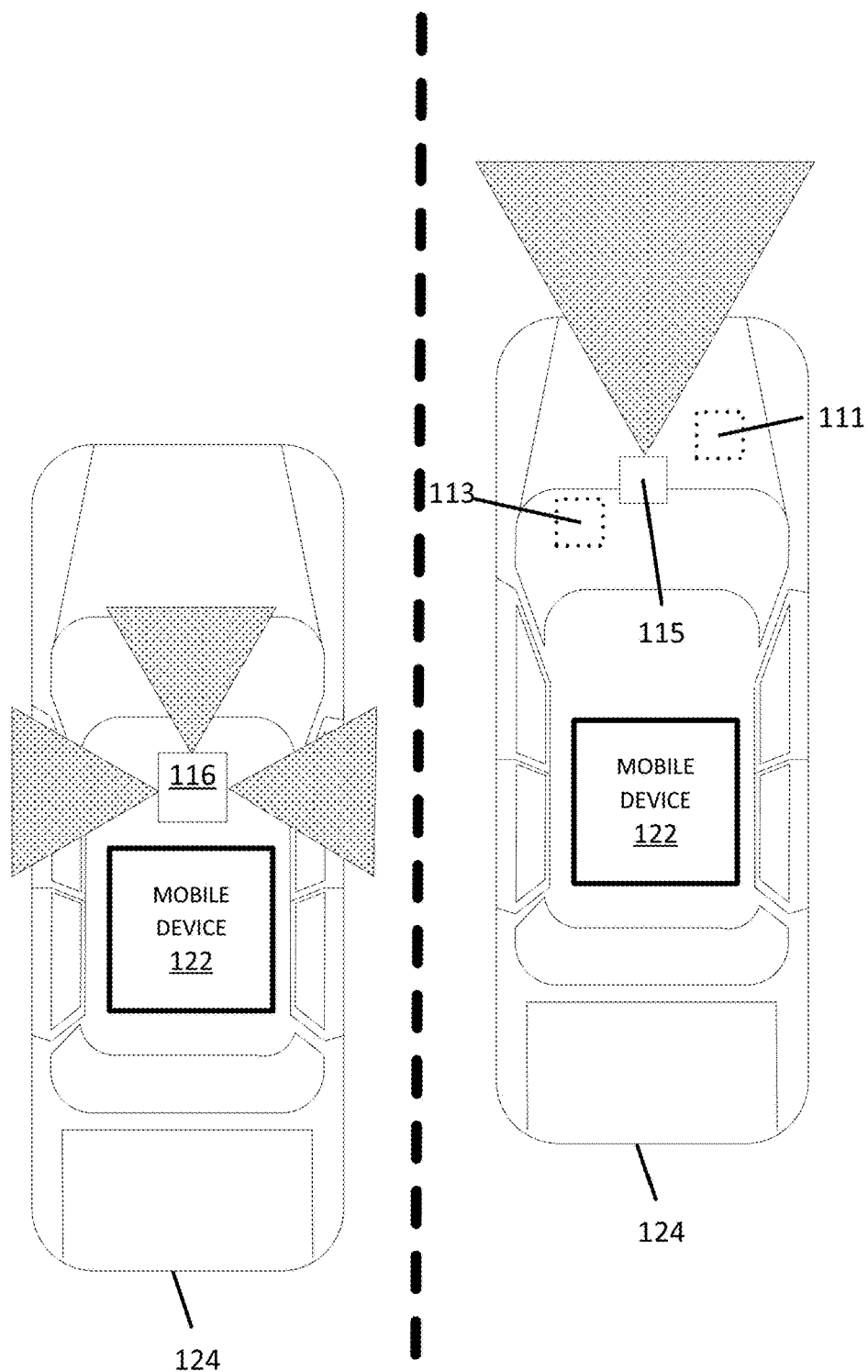
FIG. 20 illustrates exemplary vehicles of the system of FIG. 1.

FIG. 20 illustrates an exemplary vehicle 124 of the system of FIG. 1. The vehicles 124 may include a variety of devices that generate trajectory data. The trajectory data may be generated by a global positioning system, a dead reckoning-type system, cellular location system, or combinations of these or other systems, which may be referred to as position circuitry or a position detector. The positioning circuitry may include suitable sensing devices that measure the traveling distance, speed, direction, and so on, of the vehicle 124. The positioning system may also include a receiver and correlation chip to obtain a GPS or GNSS signal. Alternatively or additionally, the one or more detectors or sensors may include an accelerometer built or embedded into or within the interior of the vehicle 124. The vehicle 124 may include one or more distance data detection device or sensor, such as a light detection and ranging (LiDAR) device. The distance data detection sensor may generate point cloud data. The distance data detection sensor may include a laser range finder that rotates a mirror directing a laser to the surroundings or vicinity of the collection vehicle on a roadway or another collection device on any type of pathway. The distance data detection device may generate the trajectory data. Other types of pathways may be substituted for the roadway in any embodiment described herein.

A connected vehicle includes a communication device and an environment sensor array for reporting the surroundings of the vehicle 124 to the server 125. The connected vehicle may include an integrated communication device coupled with an in-dash navigation system. The connected vehicle may include an ad-hoc communication device such as a mobile device 122 or smartphone in communication with a vehicle system. The communication device connects the vehicle to a network including at least one other vehicle and at least one server. The network may be the Internet or connected to the internet.

The sensor array may include one or more sensors configured to detect surroundings of the vehicle 124. The sensor array may include multiple sensors. Example sensors include an optical distance system such as LiDAR 116, an image capture system 115 such as a camera, a sound distance system such as sound navigation and ranging (SONAR), a radio distancing system such as radio detection and ranging (RADAR) or another sensor. The camera may be a visible spectrum camera, an infrared camera, an ultraviolet camera or another camera.

In some alternatives, additional sensors may be included in the vehicle 124. An engine sensor 111 may include a throttle sensor that measures a position of a throttle of the engine or a position of an accelerator pedal, a brake senor that measures a position of a braking mechanism or a brake pedal, or a speed sensor that measures a speed of the engine or a speed of the vehicle wheels. Another additional example, vehicle sensor 113, may include a steering wheel angle sensor, a speedometer sensor, or a tachometer sensor.

A mobile device 122 may be integrated in the vehicle 124, which may include assisted driving vehicles such as autonomous vehicles, highly assisted driving (HAD), and advanced driving assistance systems (ADAS). Any of these assisted driving systems may be incorporated into mobile device 122. Alternatively, an assisted driving device may be included in the vehicle 124. The assisted driving device may include memory, a processor, and systems to communicate with the mobile device 122. The assisted driving vehicles may respond to the anonymized data 40 or other geographic data received from geographic database 123 and the server 125 and driving commands or navigation commands.

The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order, and may respond to the anonymized data 40 or other geographic data received from geographic database 123 and the server 125 and driving commands or navigation commands.

A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the on the position of the vehicle and may respond to the anonymized data 40 or other geographic data received from geographic database 123 and the server 125 and driving commands or navigation commands.

Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle or based on the anonymized data 40 or other geographic data received from geographic database 123 and the server 125 and driving commands or navigation commands.

Figure 21:
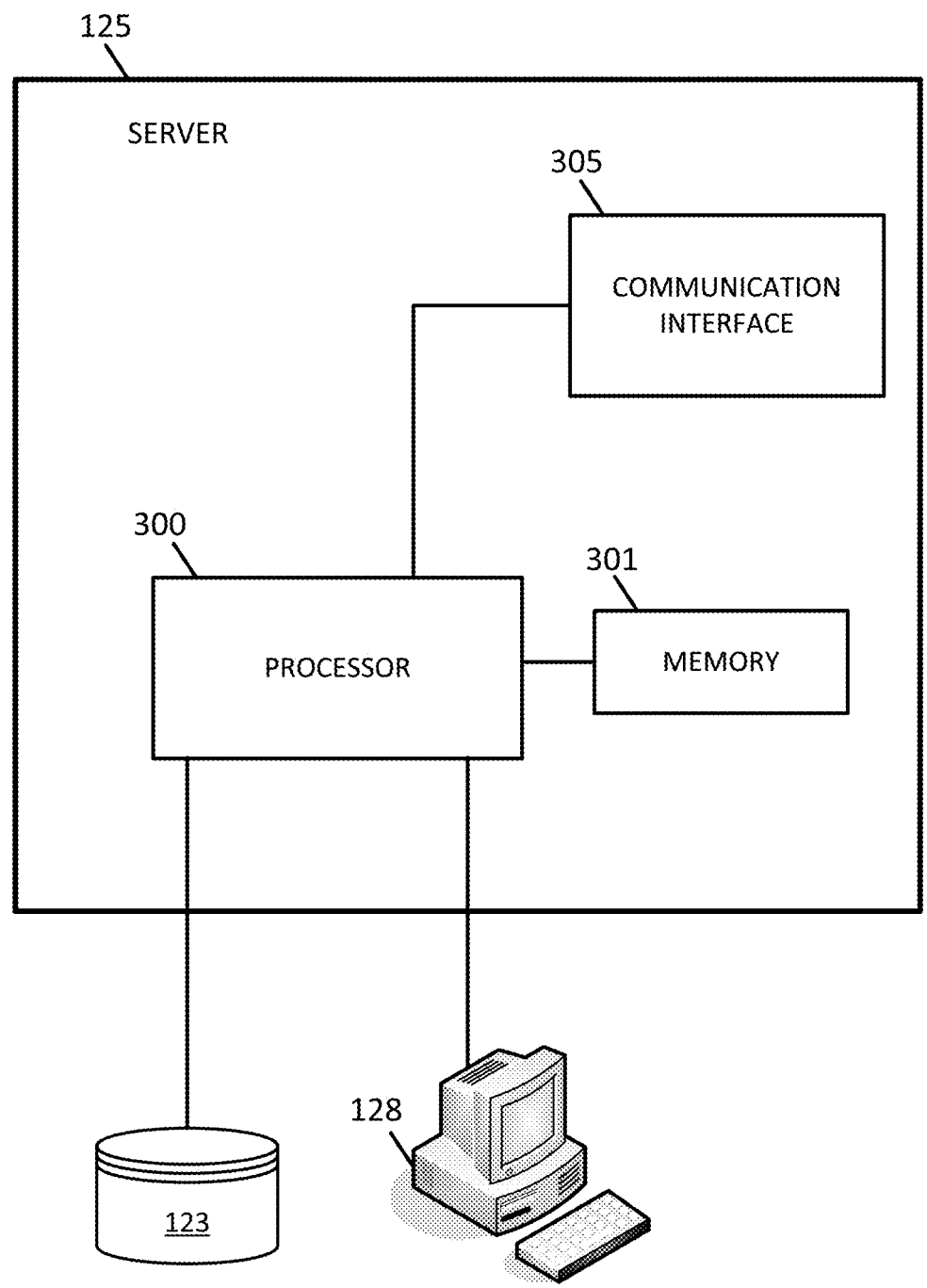
FIG. 21 illustrates an example server.

FIG. 21 illustrates an example server 125, which may apply to the system of FIG. 1. The server 125 includes a processor 300, a communication interface 305, a memory 301, and a database 123. The processor 300 may implement the functions associated with the anonymity controller 121 including the clustering calculator 37, the triangulation calculator 38, and the iteration calculator 39. The memory 301 may store the trajectory data 32, the centroid table 33, and the edge table 34. The communication interface 305 may facilitate the receipt of the probe data from the probes 101*a-n* as well as provide the anonymity data 40 to the external device 41. An input device (e.g., keyboard or personal computer 128) may be used to enter settings to the server 125. The settings may include settings for thresholds and other user preferences described herein. The settings may include the default boundaries for the clusters or the default arrangement of triangles. Additional, different, or fewer components may be provided in the server 125.

Figure 22:
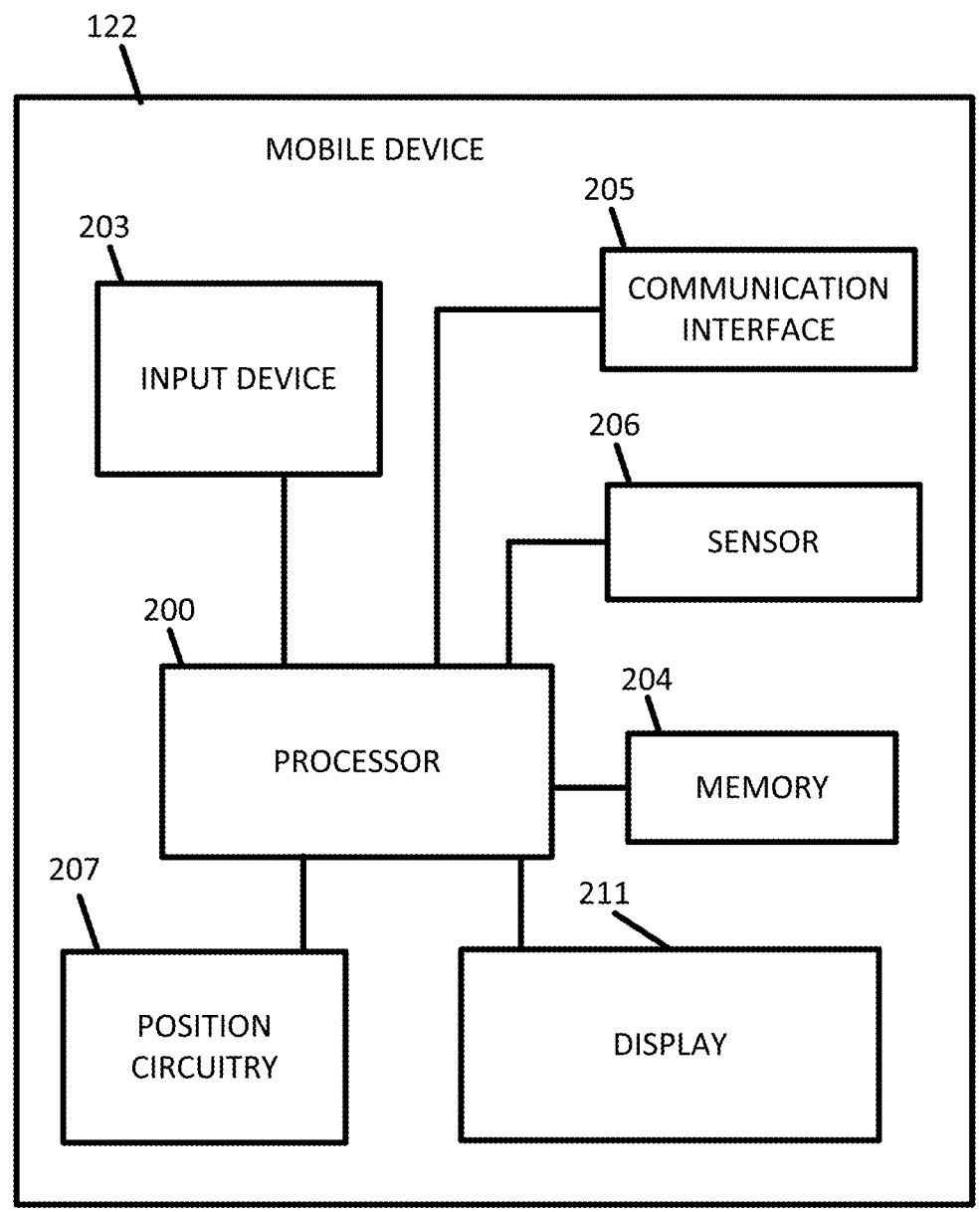
FIG. 22 illustrates an example mobile device.

FIG. 22 illustrates an exemplary mobile device 122 of the system of FIG. 1. The mobile device 122 includes a processor 200, a memory 204, an input device 203, a communication interface 205, position circuitry 207, a display 211, and a sensor 206. The input device 203 may receive commands from the user for default settings for the clustering techniques or the triangulation techniques. The default settings may include the default boundaries for the default boundaries for the clusters or the default arrangement of triangles. The settings may include anonymity levels or thresholds.

The processor 200 may communicate with a vehicle ECU which operates one or more driving mechanisms (e.g., accelerator, brakes, steering device). Alternatively, the mobile device 122 may be the vehicle ECU, which operates the one or more driving mechanisms directly. The sensor 206 may include a camera, a LiDAR device, or another sensor described herein. The sensor 206 may detect congestion local to the mobile device 122. The sensor 206 may detect when an intersection is approaching. Additional, different, or fewer components are possible for the mobile device 122.

Figure 23:
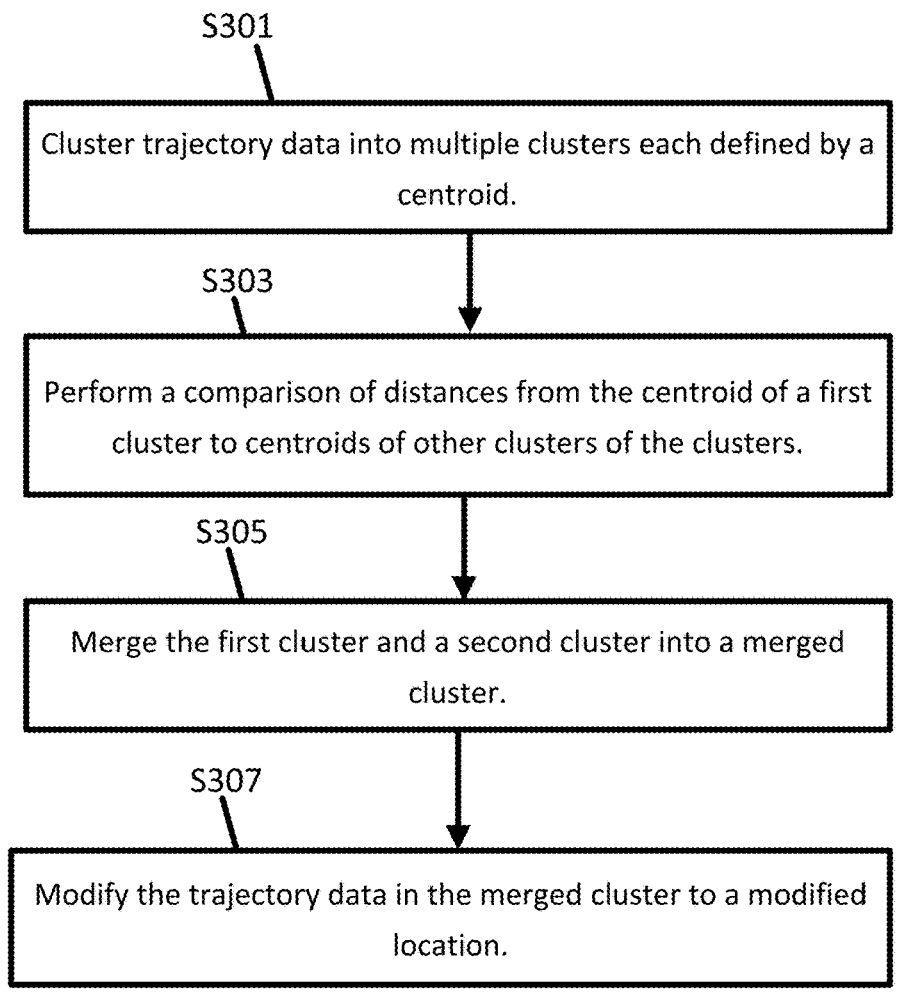
FIGS. 23 and 24 illustrate example flow charts for the operations of the server and/or the mobile device.
Figure 24:
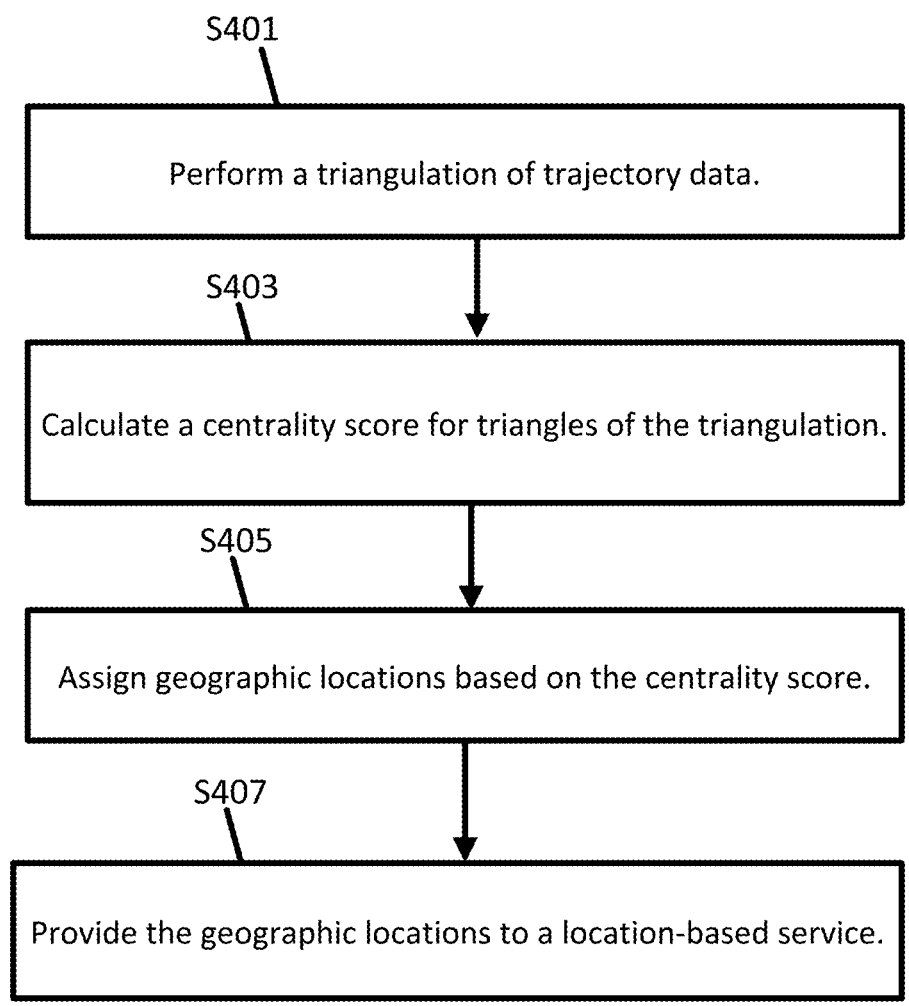

FIGS. 23 and 24 illustrates example flowcharts for the operation of mobile device 122 or the server 125. Additional, different, or fewer acts may be provided.

In one example, the mobile device 122 collects the trajectory data using the position circuitry 207. The position circuitry 207 or the processor 200 detects a geographic position of the mobile device 122 or the vehicle 124. The position circuitry 207 is one example means for detecting or determining a geographic position. The processor 200 may also include circuitry serving as means for detecting or determining a geographic position. The detected geographic position of the mobile device 122 may include a latitude and longitude pair. The geographic position may be detected or sampled at periodic intervals in time or distance or may be continuously detected. The sensor 206, which may include distancing sensors, range sensor, image sensors, or another sensor as described with respect to FIG. 20 may also provide information for determining the geographic position of the mobile device 122.

Either the mobile device 122 or the server 125 performs the acts of FIG. 23. The resulting anonymized data may be provided back to the mobile device 122 or other mobile devices 122 for the location based service.

At act S301, the processor 200 or the processor 300 clusters trajectory data into multiple clusters each defined by a centroid and boundaries as described in the examples herein. The processor 200 may include a clustering module including an application specific module or processor that calculates the clusters. The clustering module is an example means for clustering the trajectory data into multiple clusters defined by a centroid.

At act S303, the processor 200 or the processor 300 performs a comparison of distances from the centroid of a first cluster to centroids of other clusters of the plurality of clusters. The distances between pairs of centroids may be stored in a centroid table and sorted according to distance. The closest pair, or a specified number of closest pairs, may be selected. The processor 200 may include a comparison module including an application specific module or processor that calculates the clusters. The clustering module is an example means for comparing the distances between cluster centroids.

At act S305, the processor 200 or the processor 300 merges the first cluster and a second cluster into a merged cluster. In merging, the boundaries of the clusters are modified to create a single cluster. The new cluster has a new centroid, which may be initially set as the midpoint between the previous centroids. The new centroid may be re-centered through subsequent iterations of the clustering process. The processor 200 may include a merging module including an application specific module or processor that calculates the clusters. The merging module is an example means for merging the first cluster and the second cluster.

At act S307, the processor 200 or the processor 300 modifies the trajectory data in the merged cluster to a modified location. The geographic locations originally associated with the trajectory data may be modified to new geographic location in response to the merged cluster. The new geographic location may be the centroid of the new cluster. The processor 200 may include a location modification module including an application specific module or processor that calculates the clusters. The modification module is an example means for modifying the trajectory data in the merged cluster to a modified location.

FIG. 24 illustrates example flowcharts for the operation of mobile device 122 or the server 125. Additional, different, or fewer acts may be provided.

At act S401, the processor 200 or the processor 300 performs a triangulation of trajectory data. The triangulation including triangles defined by vertices such that a circle that intersects the vertices of at least one of the triangles is free of the trajectory data other than the points assigned to the vertices. In other words, the triangles are selected so that no other trajectory data besides the vertices are included in the interior of the triangle and/or no other trajectory data besides the vertices are include in a circle that minimally includes the triangle. A circle that minimally includes the triangle is the smallest circle that includes the triangle in the interior of the triangle. The processor 200 may include a triangulation module including an application specific module or processor that performs a triangulation of trajectory data. The triangulation module is an example means for performing a triangulation of trajectory data.

At act S403, the processor 200 or the processor 300 calculates a centrality score for one or more of the triangles. The centrality score may be based on neighborhood information for each point in the trajectory and then use the centrality score of its neighborhood to relocate a given point. The processor 200 may include a centrality module including an application specific module or processor that calculates the centrality score. The centrality module is an example means for calculating a centrality score for each of the triangles.

At act S405, the processor 200 or the processor 300 assigns geographic locations to the trajectory data according to the centrality score. The geographic locations assigned to the vertices are selected based on modifications of centrality scores in response to the magnitude of neighboring centrality scores and neighboring vertices. The processor 200 may include an anonymization module including an application specific module or processor that assigns the geographic location. The anonymization module is an example means for assigning geographic locations to the trajectory data according to the centrality score.

At act S407, the processor 200 or the processor 300, or the communication interface 205 or 305, provides the geographic location to a location-based service. A message may be constructed including headers, timestamps, and a payload including the modified geographic locations. The message may include anonymous identifiers for the trajectory data. The communication interface 205 or 305 is an example means for providing the geographic location to a location-based service.

The processor 200 or 300 may include a routing module including an application specific module or processor that calculates routing between an origin and destination. The routing module is an example means for generating a route in response to the anonymized data 40 to the destination. The routing command may be a driving instruction (e.g., turn left, go straight), which may be presented to a driver or passenger, or sent to an assisted driving system. The display 211 is an example means for displaying the routing command. The mobile device 122 may generate a routing instruction based on the anonymized data 40.

The routing instructions may be provided by display 211. The mobile device 122 may be configured to execute routing algorithms to determine an optimum route to travel along a road network from an origin location to a destination location in a geographic region. Using input(s) including map matching values from the server 125, a mobile device 122 examines potential routes between the origin location and the destination location to determine the optimum route. The mobile device 122, which may be referred to as a navigation device, may then provide the end user with information about the optimum route in the form of guidance that identifies the maneuvers required to be taken by the end user to travel from the origin to the destination location. Some mobile devices 122 show detailed maps on displays outlining the route, the types of maneuvers to be taken at various locations along the route, locations of certain types of features, and so on. Possible routes may be calculated based on a Dijkstra method, an A-star algorithm or search, and/or other route exploration or calculation algorithms that may be modified to take into consideration assigned cost values of the underlying road segments.

The mobile device 122 may plan a route through a road system or modify a current route through a road system in response to the request for additional observations of the road object. For example, when the mobile device 122 determines that there are two or more alternatives for the optimum route and one of the routes passes the initial observation point, the mobile device 122 selects the alternative that passes the initial observation point. The mobile devices 122 may compare the optimal route to the closest route that passes the initial observation point. In response, the mobile device 122 may modify the optimal route to pass the initial observation point.

The mobile device 122 may be a personal navigation device ("PND"), a portable navigation device, a mobile phone, a personal digital assistant ("PDA"), a watch, a tablet computer, a notebook computer, and/or any other known or later developed mobile device or personal computer. The mobile device 122 may also be an automobile head unit, infotainment system, and/or any other known or later developed automotive navigation system. Non-limiting embodiments of navigation devices may also include relational database service devices, mobile phone devices, car navigation devices, and navigation devices used for air or water travel.

The geographic database 123 may include map data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the map data. The map data may include structured cartographic data or pedestrian routes. The map data may include map features that describe the attributes of the roads and intersections. The map features may include geometric features, restrictions for traveling the roads or intersections, roadway features, or other characteristics of the map that affects how vehicles 124 or mobile device 122 flor through a geographic area. The geometric features may include curvature, slope, or other features. The curvature of a road segment describes a radius of a circle that in part would have the same path as the road segment. The slope of a road segment describes the difference between the starting elevation and ending elevation of the road segment. The slope of the road segment may be described as the rise over the run or as an angle. The geographic database 123 may also include other attributes of or about the roads such as, for example, geographic coordinates, street names, address ranges, speed limits, turn restrictions at intersections, and/or other navigation related attributes (e.g., one or more of the road segments is part of a highway or toll way, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The databases may also contain one or more node data record(s) which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

Figure 25:
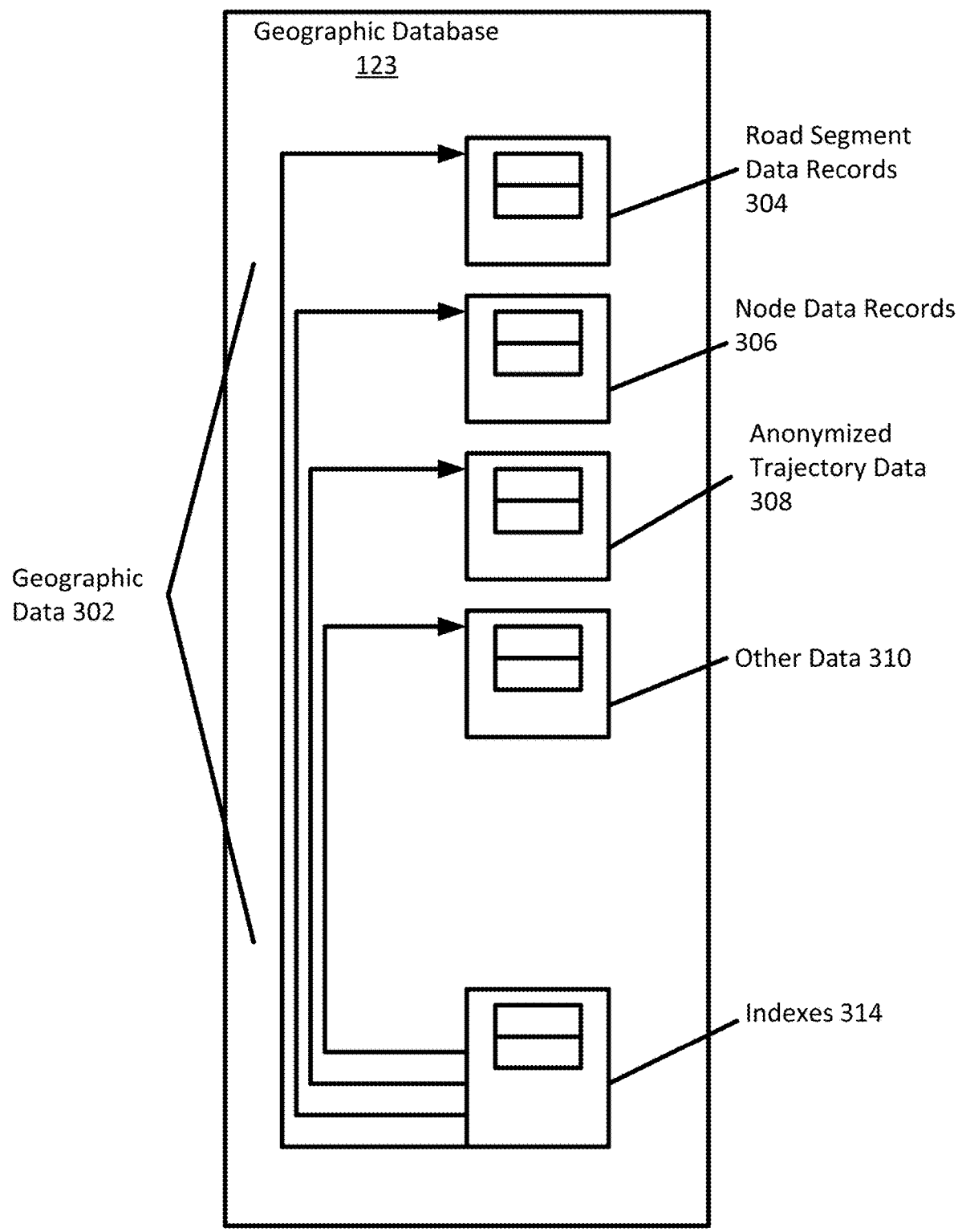
FIGS. 25 and 26 illustrate example geographic databases.

In FIG. 25, the geographic database 123 may contain at least one road segment database record 304 (also referred to as "entity" or "entry") for each road segment in a particular geographic region. The geographic database 123 may also include a node database record 306 (or "entity" or "entry") for each node in a particular geographic region. The terms "nodes" and "segments" represent only one terminology for describing these physical geographic features, and other terminology for describing these features is intended to be encompassed within the scope of these concepts. The geographic database 123 may also include location fingerprint data for specific locations in a particular geographic region.

The geographic database 123 may include other kinds of data 310. The other kinds of data 310 may represent other kinds of geographic features or anything else. The other kinds of data may include POI data. For example, the POI data may include POI records comprising a type (e.g., the type of POI, such as restaurant, hotel, city hall, police station, historical marker, ATM, golf course, etc.), location of the POI, a phone number, hours of operation, etc.

The geographic database 123 also includes indexes 314. The indexes 314 may include various types of indexes that relate the different types of data to each other or that relate to other aspects of the data contained in the geographic database 123. For example, the indexes 314 may relate the nodes in the node data records 306 with the end points of a road segment in the road segment data records 304.

As another example, the indexes 314 may relate anonymized trajectory data 308 with a road segment in the segment data records 304 or a geographic coordinate. An index 314 may, for example, store anonymized trajectory data 308 relating to one or more trajectories that have been anonymized using the embodiments described herein. The database 123 may also include the centroid table 33 and/or the edge table 34.

The geographic database 123 may also include other attributes of or about roads such as, for example, geographic coordinates, physical geographic features (e.g., lakes, rivers, railroads, municipalities, etc.) street names, address ranges, speed limits, turn restrictions at intersections, and/or other navigation related attributes (e.g., one or more of the road segments is part of a highway or toll way, the location of stop signs and/or stoplights along the road segments), as well as POIs, such as gasoline stations, hotels, restaurants, museums, stadiums, offices, automobile dealerships, auto repair shops, buildings, stores, parks, municipal facilities, other businesses, etc. The geographic database 123 may also contain one or more node data record(s) 306 which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data 302 may additionally or alternatively include other data records such as, for example, POI data records, topographical data records, cartographic data records, routing data, and maneuver data. Other contents of the database 123 may include temperature, altitude or elevation, lighting, sound or noise level, humidity, atmospheric pressure, wind speed, the presence of magnetic fields, electromagnetic interference, or radio- and micro-waves, cell tower and wi-fi information, such as available cell tower and wi-fi access points, and attributes pertaining to specific approaches to a specific location.

The geographic database 123 may include historical traffic speed data for one or more road segments. The geographic database 123 may also include traffic attributes for one or more road segments. A traffic attribute may indicate that a road segment has a high probability of traffic congestion.

Figure 26:
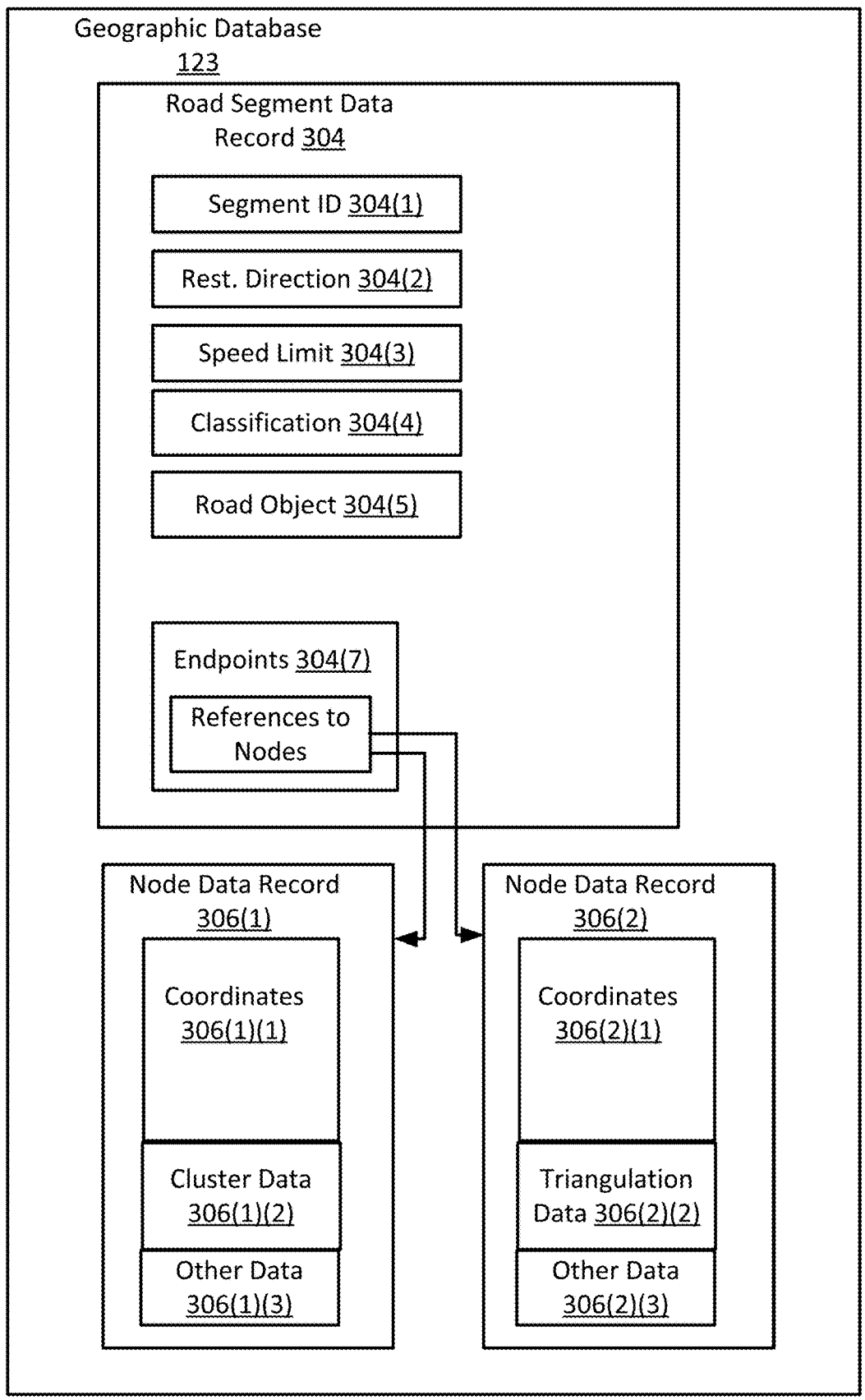

FIG. 26 shows some of the components of a road segment data record 304 contained in the geographic database 123 according to one embodiment. The road segment data record 304 may include a segment ID 304(1) by which the data record can be identified in the geographic database 123. Each road segment data record 304 may have associated with it information (such as "attributes", "fields", etc.) that describes features of the represented road segment. The road segment data record 304 may include data 304(2) that indicate the restrictions, if any, on the direction of vehicular travel permitted on the represented road segment. The road segment data record 304 may include data 304(3) that indicate a speed limit or speed category (i.e., the maximum permitted vehicular speed of travel) on the represented road segment. The road segment data record 304 may also include classification data 304(4) indicating whether the represented road segment is part of a controlled access road (such as an expressway), a ramp to a controlled access road, a bridge, a tunnel, a toll road, a ferry, and so on. The road segment data record may include location fingerprint data, for example a set of sensor data for a particular location.

The geographic database 123 may include road segment data records 304 (or data entities) that describe features such as road objects 304(5). The road objects 304(5) may be stored according to location boundaries or vertices. The road objects 304(5) may be stored as a field or record using a scale of values such as from 1 to 100 for type or size. The road objects may be stored using categories such as low, medium, or high. Additional schema may be used to describe the road objects. The attribute data may be stored in relation to a link/segment 304, a node 306, a strand of links, a location fingerprint, an area, or a region. The geographic database 123 may store information or settings for display preferences. The geographic database 123 may be coupled to a display. The display may be configured to display the roadway network and data entities using different colors or schemes.

The road segment data record 304 also includes data 304(7) providing the geographic coordinates (e.g., the latitude and longitude) of the end points of the represented road segment. In one embodiment, the data 304(7) are references to the node data records 306 that represent the nodes corresponding to the end points of the represented road segment.

The road segment data record 304 may also include or be associated with other data 304(7) that refer to various other attributes of the represented road segment. The various attributes associated with a road segment may be included in a single road segment record, or may be included in more than one type of record which cross-references to each other. For example, the road segment data record 304 may include data identifying what turn restrictions exist at each of the nodes which correspond to intersections at the ends of the road portion represented by the road segment, the name, or names by which the represented road segment is identified, the street address ranges along the represented road segment, and so on.

FIG. 26 also shows some of the components of a node data record 306 that may be contained in the geographic database 123. Each of the node data records 306 may have associated information (such as "attributes", "fields", etc.) that allows identification of the road segment(s) that connect to it and/or its geographic position (e.g., its latitude and longitude coordinates). The node data records 306(1) and 306(2) include the latitude and longitude coordinates 306(1)(1) and 306(2)(1) for their node, and cluster data 306(1)(2), which may include the centroids and boundaries for the clustering techniques described herein and/or triangulation data 306(2)(2), which may include the vertices for the triangulation techniques described herein. The cluster data 306(1)(2) and triangulation 306(2)(2) may change dynamically or over time. The node data records 306(1) and 306(2) may also include other data 306(1)(3) and 306(2)(3) that refer to various other attributes of the nodes.

The geographic database 123 may be maintained by a content provider (e.g., a map developer). By way of example, the map developer may collect geographic data to generate and enhance the geographic database 123. The map developer may obtain data from sources, such as businesses, municipalities, or respective geographic authorities. In addition, the map developer may employ field personnel to travel throughout a geographic region to observe features and/or record information about the roadway. Remote sensing, such as aerial or satellite photography, may be used. The database 123 may be incorporated in or connected to the server 125.

The geographic database 123 and the data stored within the geographic database 123 may be licensed or delivered on-demand. Other navigational services or traffic server providers may access the location fingerprint data, traffic data and/or the lane line object data stored in the geographic database 123.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 801 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The databases 123 may include geographic data used for traffic and/or navigation-related applications. The geographic data may include data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the geographic data. The geographic data may include structured cartographic data or pedestrian routes.

The databases may also include other attributes of or about the roads such as, for example, geographic coordinates, street names, address ranges, speed limits, turn restrictions at intersections, and/or other navigation related attributes (e.g., one or more of the road segments is part of a highway or toll way, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The databases may also contain one or more node data record(s) which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

The databases may include historical traffic speed data for one or more road segments. The databases may also include traffic attributes for one or more road segments. A traffic attribute may indicate that a road segment has a high probability of traffic congestion.

The input device 203 may be one or more buttons, keypad, keyboard, mouse, stylus pen, trackball, rocker switch, touch pad, voice recognition circuit, or other device or component for inputting data to the mobile device 122. The input device 203 and display 211 may be combined as a touch screen, which may be capacitive or resistive. The display 211 may be a liquid crystal display (LCD) panel, light emitting diode (LED) screen, thin film transistor screen, or another type of display. The output interface of the display 211 may also include audio capabilities, or speakers. In an embodiment, the input device 203 may involve a device having velocity detecting abilities.

The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

The position circuitry 207 may also include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. In an embodiment, a vehicle may be considered a mobile device, or the mobile device may be integrated into a vehicle.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory.

Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The following example embodiments of the invention are also disclosed:

Embodiment 1

A method for providing anonymity in geographic data for probe devices in a geographic region for a location-based service, the method comprising:
  receiving trajectory data based on sequences of sensor measurements of the probe devices;
  clustering, by a processor, the trajectory data, according to a first iteration threshold, into a plurality of clusters each defined by a cluster point;
  selecting a first cluster from the plurality of clusters;
  performing, by the processor, a comparison of distances from the cluster point of the first cluster to cluster points of other clusters of the plurality of clusters;
  selecting a second cluster from the plurality of clusters based on the comparison of distances;
  merging the first cluster and the second cluster into a merged cluster;
  calculating, by the processor, a merged cluster point for the merged cluster;
  modifying the trajectory data in the merged cluster to a modified location based on the merged cluster point; and
  providing anonymized locations including the modified location to the location-based service.

Embodiment 2

The method of embodiment 1, wherein the cluster point for the second cluster is spaced from the cluster point of the first cluster by a shortest distance and the merged cluster includes at least the two closest clusters in the plurality of clusters or the merged cluster includes at least the two densest clusters.

Embodiment 3

The method of any of embodiments 1 and 2, wherein the cluster point for the second cluster is spaced from the cluster point of the first cluster by a longest distance and the merged cluster includes at least the two farthest spaced clusters in the plurality of clusters or the merged cluster includes at least the two sparsest clusters.

Embodiment 4

The method of any of embodiments 1 to 3, wherein clustering the trajectory data comprises:
- selecting a plurality of initial centroids from the trajectory data;
- calculating the plurality of clusters using the plurality of initial centroids;
- calculating a plurality of subsequent centroids based on an average of data in each of the plurality of clusters.

Embodiment 5

The method of any of embodiments 1 to 4, further comprising:
- calculating a count of the trajectory data in each of the plurality of clusters;
- performing a comparison of the count of the trajectory data to a threshold; and
- removing at least one cluster from the plurality of clustering in response to the count for the at least one cluster being less than the threshold.

Embodiment 6

The method of any of embodiments 1 to 5, further comprising:
- identifying a stopping criterion, wherein the anonymized locations including the modified location are provided to the location-based service in response to the stopping criterion.

Embodiment 7

The method of any of embodiments 1 to 6, wherein the stopping criterion includes a difference threshold between cluster points from one iteration to a subsequent iteration.

Embodiment 8

The method of any of embodiments 1 to 7, wherein the stopping criterion includes a predetermined number of iterations.

Embodiment 9

The method of any of embodiments 1 to 8, further comprising:
- repeating at least the modifying the trajectory data in the merged cluster to a subsequent modified location based on the merged cluster point until the stopping criterion is met.

Embodiment 10

An apparatus, configured to perform and/or control the method of any of embodiments 1-9 or comprising means for performing and/or controlling any of embodiments 1-9.

Embodiment 11

An apparatus, comprising at least one processor and at least one memory including computer program code for one or more programs, the at least one memory and the computer program code configured to, with the at least one processor, to perform and/or control the method of any of embodiments 1-9.

Embodiment 12

A computer program comprising instructions operable to cause a processor to perform and/or control the method of any of embodiments 1-9, when the computer program is executed on the processor.

I claim:

1. A method for providing anonymity in geographic data for probe devices in a geographic region for a location-based service, the method comprising:
   - receiving trajectory data based on sequences of sensor measurements of the probe devices;
   - clustering, by a processor, the trajectory data, according to a first iteration threshold, into a plurality of clusters each defined by a cluster point;
   - selecting a first cluster from the plurality of clusters;
   - performing, by the processor, a comparison of distances from the cluster point of the first cluster to cluster points of other clusters of the plurality of clusters;
   - selecting a second cluster from the plurality of clusters based on the comparison of distances;
   - merging the first cluster and the second cluster into a merged cluster;
   - calculating, by the processor, a merged cluster point for the merged cluster;
   - modifying the trajectory data in the merged cluster to a modified location based on the merged cluster point;
   - identifying a stopping criterion; and
   - providing anonymized locations including the modified location to the location-based service, wherein the anonymized locations including the modified location are provided to the location-based service in response to the stopping criterion.

2. The method of claim 1, wherein the cluster point for the second cluster is spaced from the cluster point of the first cluster by a shortest distance and the merged cluster includes at least the two closest clusters in the plurality of clusters or the merged cluster includes at least the two densest clusters.

3. The method of claim 1, wherein the cluster point for the second cluster is spaced from the cluster point of the first cluster by a longest distance and the merged cluster includes at least the two farthest spaced clusters in the plurality of clusters or the merged cluster includes at least the two sparsest clusters.

4. The method of claim 1, wherein clustering the trajectory data comprises:
   - selecting a plurality of initial centroids from the trajectory data;
   - calculating the plurality of clusters using the plurality of initial centroids;
   - calculating a plurality of subsequent centroids based on an average of data in each of the plurality of clusters.

5. The method of claim 1, further comprising:
   - calculating a count of the trajectory data in each of the plurality of clusters;
   - performing a comparison of the count of the trajectory data to a threshold; and
   - removing at least one cluster from the plurality of clustering in response to the count for the at least one cluster being less than the threshold.

6. The method of claim 1, wherein the stopping criterion includes a difference threshold between cluster points from one iteration to a subsequent iteration.

7. The method of claim 1, wherein the stopping criterion includes a predetermined number of iterations.

8. The method of claim 1, further comprising:
repeating at least the modifying the trajectory data in the merged cluster to a subsequent modified location based on the merged cluster point until the stopping criterion is met.

9. An apparatus for providing anonymity in geographic data for probe devices in a geographic region for a location-based service, the apparatus comprising:
a database configured to store trajectory data based on sequences of sensor measurements of the probe devices;
a processor configured to implement:
a clustering calculator configured to cluster the trajectory data, according to a first iteration threshold, into a plurality of clusters each defined by a cluster point and configured to perform a comparison of a distance for a first cluster from the plurality of clusters to cluster points of other clusters of the plurality of clusters, wherein the clustering calculator is configured to select a second cluster from the plurality of clusters based on the comparison of distances and merge the first cluster and the second cluster into a merged cluster, and
an anonymity controller configured to modify the trajectory data to provide a predetermined level of anonymity to locations from the trajectory data in response to the merged cluster, wherein the clustering calculator is configured to identify a stopping criterion, wherein the anonymized locations are provided to the location-based service in response to the stopping criterion.

10. The apparatus of claim 9, wherein the anonymity controller is configured to modify the trajectory data in the merged cluster to a modified location based on a cluster point of the merged cluster.

11. The apparatus of claim 9, wherein the cluster point for the second cluster is spaced from the cluster point of the first cluster by a shortest distance and the merged cluster includes at least the two closest clusters in the plurality of clusters or the merged cluster includes at least the two densest clusters.

12. The apparatus of claim 9, wherein the cluster point for the second cluster is spaced from the cluster point of the first cluster by a longest distance and the merged cluster includes at least the two farthest spaced clusters in the plurality of clusters or the merged cluster includes at least the two sparsest clusters.

13. The apparatus of claim 9, wherein the clustering calculator is configured to select a plurality of initial centroids from the trajectory data, calculate the plurality of clusters using the plurality of initial centroids, and calculate a plurality of subsequent centroids based on an average of data in each of the plurality of clusters.

14. The apparatus of claim 9, wherein the clustering calculator is configured to compare a count of the trajectory data in each of the plurality of clusters to a threshold and remove at least one cluster from the plurality of clustering in response to the count for the at least one cluster being less than the threshold.

15. A non-transitory computer readable medium including instructions that when executed by a process are configured to perform:
receiving trajectory data based on sequences of sensor measurements of probe devices;
clustering the trajectory data, according to a first iteration threshold into a plurality of clusters each defined by a centroid;
selecting a first cluster from the plurality of clusters;
performing a comparison of distances from the centroid of the first cluster to centroids of other clusters of the plurality of clusters;
selecting a second cluster from the plurality of clusters based on the comparison of distances;
merging the first cluster and the second cluster into a merged cluster;
calculating a merged cluster point for the merged cluster;
modifying the trajectory data in the merged cluster to a modified location based on the merged cluster point;
identifying a stopping criterion; and
providing anonymized locations including the modified location to a location-based service in response to the stopping criterion.

16. The non-transitory computer readable medium of claim 15, wherein a centroid for a second cluster is spaced from the centroid of the first cluster by a shortest distance and the merged cluster includes at least the two closest clusters in the plurality of clusters or the merged cluster includes at least the two densest clusters.

17. The non-transitory computer readable medium of claim 15, wherein a cluster point for a second cluster is spaced from the centroid of the first cluster by a longest distance and the merged cluster includes at least the two farthest spaced clusters in the plurality of clusters or the merged cluster includes at least the two sparsest clusters.

* * * * *